(12) United States Patent
Lakshmanan et al.

(10) Patent No.: US 9,213,590 B2
(45) Date of Patent: Dec. 15, 2015

(54) NETWORK MONITORING AND DIAGNOSTICS

(71) Applicant: Brocade Communications Systems, Inc., San Jose, CA (US)

(72) Inventors: Subramanian Lakshmanan, San Jose, CA (US); Vineet M. Abraham, Sunnyvale, CA (US); Sathish Gnanasekaren, Sunnyvale, CA (US); Michael Gee, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 167 days.

(21) Appl. No.: 13/830,286

(22) Filed: Mar. 14, 2013

(65) Prior Publication Data

US 2014/0006871 A1    Jan. 2, 2014

Related U.S. Application Data

(60) Provisional application No. 61/665,190, filed on Jun. 27, 2012.

(51) Int. Cl.
  *G06F 11/00*  (2006.01)
  *G06F 11/07*  (2006.01)
  *H04L 12/24*  (2006.01)

(52) U.S. Cl.
  CPC ............ *G06F 11/079* (2013.01); *H04L 41/046* (2013.01); *H04L 41/064* (2013.01); *H04L 41/065* (2013.01)

(58) Field of Classification Search
  CPC .............. G06F 11/0781; G06F 11/079; G06F 11/3466; G06F 11/3006; G06F 11/3075
  See application file for complete search history.

(56) References Cited

U.S. PATENT DOCUMENTS

| | | | | |
|---|---|---|---|---|
| 5,740,354 | A | * | 4/1998 | Ben-Natan et al. ............. 714/45 |
| 7,231,550 | B1 | * | 6/2007 | McGuire et al. ................ 714/26 |

(Continued)

FOREIGN PATENT DOCUMENTS

| | | |
|---|---|---|
| WO | 97/28626 A1 | 8/1997 |
| WO | 2012/081076 A1 | 6/2012 |
| WO | WO 2014/004721 A1 | 1/2014 |

OTHER PUBLICATIONS

U.S. Appl. No. 13/791,367, filed Mar. 8, 2013 by V. Kallarackal et al. (Unpublished).

(Continued)

*Primary Examiner* — Philip Guyton
(74) *Attorney, Agent, or Firm* — Kilpatrick Townsend & Stockton LLP

(57) ABSTRACT

Techniques are provided for monitoring and diagnosis of a network comprising one or more devices. In some embodiments, techniques are provided for gathering network information, analyzing the gathered information to identify correlations, and for diagnosing a problem based upon the correlations. The diagnosis may identify a root cause of the problem. In certain embodiments, a computing device may be configurable to determine a first event from information, allocate a first event to a first cluster, the first cluster is from one or more clusters of events, based on a set of attributes for the first event, and determine a set of attributes for the first cluster, and rank the first cluster against the other clusters from the one or more clusters of events based on the set of attributes for the first cluster. The set of attributes may be indicative of the relationship between events in the cluster. In some embodiments, one or more recommendations may be provided for taking preventative or corrective actions for the problem.

19 Claims, 13 Drawing Sheets

(56) References Cited

U.S. PATENT DOCUMENTS

| | | | |
|---|---|---|---|
| 9,049,139 B2 | 6/2015 | Kallarackal et al. | |
| 2003/0097617 A1* | 5/2003 | Goeller et al. | 714/39 |
| 2004/0078695 A1* | 4/2004 | Bowers et al. | 714/39 |
| 2005/0172162 A1 | 8/2005 | Takahashi et al. | |
| 2007/0250813 A1 | 10/2007 | Sanghvi et al. | |
| 2007/0261017 A1 | 11/2007 | Sanghvi et al. | |
| 2007/0261018 A1 | 11/2007 | Sanghvi et al. | |
| 2007/0268882 A1 | 11/2007 | Breslau et al. | |
| 2007/0286198 A1 | 12/2007 | Miurhead et al. | |
| 2007/0288467 A1 | 12/2007 | Strassner et al. | |
| 2007/0300228 A1 | 12/2007 | White, III et al. | |
| 2008/0019286 A1 | 1/2008 | Wurst et al. | |
| 2008/0021994 A1 | 1/2008 | Grelewicz et al. | |
| 2008/0025223 A1 | 1/2008 | Karacali-Akyamac et al. | |
| 2008/0025227 A1 | 1/2008 | Puttu et al. | |
| 2008/0037443 A1 | 2/2008 | Ansari et al. | |
| 2008/0037532 A1 | 2/2008 | Sykes et al. | |
| 2008/0086345 A1 | 4/2008 | Wilson et al. | |
| 2008/0133288 A1* | 6/2008 | Thibaux et al. | 705/7 |
| 2008/0172480 A1 | 7/2008 | Agrawal et al. | |
| 2008/0235366 A1 | 9/2008 | Telfer et al. | |
| 2008/0239955 A1 | 10/2008 | Chang et al. | |
| 2008/0281607 A1 | 11/2008 | Sajja et al. | |
| 2008/0281660 A1 | 11/2008 | Sajja et al. | |
| 2008/0298229 A1 | 12/2008 | Ballnatyne et al. | |
| 2009/0028053 A1 | 1/2009 | Kannan et al. | |
| 2009/0106605 A1* | 4/2009 | Kuchibhotla et al. | 714/47 |
| 2009/0122710 A1 | 5/2009 | Bar-Tor et al. | |
| 2009/0125532 A1 | 5/2009 | Wexler et al. | |
| 2009/0168645 A1 | 7/2009 | Tester et al. | |
| 2009/0181665 A1 | 7/2009 | Sater et al. | |
| 2009/0182698 A1 | 7/2009 | Bethke et al. | |
| 2009/0183029 A1 | 7/2009 | Bethke et al. | |
| 2009/0183030 A1 | 7/2009 | Bethke et al. | |
| 2009/0183031 A1 | 7/2009 | Bethke et al. | |
| 2009/0187652 A1 | 7/2009 | Ho | |
| 2009/0210523 A1 | 8/2009 | Duggan | |
| 2009/0216881 A1 | 8/2009 | Lovy et al. | |
| 2009/0232025 A1 | 9/2009 | Baggott et al. | |
| 2009/0313367 A1 | 12/2009 | Alon et al. | |
| 2010/0020715 A1 | 1/2010 | Monaco et al. | |
| 2010/0077077 A1 | 3/2010 | Devitt | |
| 2010/0131650 A1 | 5/2010 | Pok et al. | |
| 2010/0138688 A1 | 6/2010 | Sykes et al. | |
| 2010/0153350 A1 | 6/2010 | Yahalom et al. | |
| 2010/0174945 A1* | 7/2010 | Watanabe et al. | 714/26 |
| 2010/0198651 A1 | 8/2010 | Johnson et al. | |
| 2010/0198730 A1 | 8/2010 | Ahmed et al. | |
| 2010/0235493 A1 | 9/2010 | Besaw et al. | |
| 2011/0060765 A1 | 3/2011 | Sieb | |
| 2011/0078300 A9 | 3/2011 | Grelewicz et al. | |
| 2011/0085443 A1 | 4/2011 | Shikano | |
| 2011/0126054 A1 | 5/2011 | Hayward et al. | |
| 2011/0138456 A1 | 6/2011 | Ormazabal et al. | |
| 2011/0141913 A1 | 6/2011 | Clemens et al. | |
| 2011/0141914 A1 | 6/2011 | Yang et al. | |
| 2011/0276843 A1* | 11/2011 | Echevarria et al. | 714/55 |
| 2014/0010092 A1 | 1/2014 | Kallarackal | |
| 2014/0146686 A1 | 5/2014 | Sakurai et al. | |

OTHER PUBLICATIONS

HP Open View, "*Network Node Manager 6.4 and Network Node Manage Extended Topology 2.0*", Product Brief, © Copyright Hewlett-Packard Company 2003, 8 pages.

Cisco, Chapter 3 "*Cisco ANA Event Correlation and Suppression*", Cisco Active Network Abstraction Fault Management User Guide, Version 3.6 Service Pack 1, 4 pages.

Crump, "*Improving VMWare Storage I/O Performance by Realigning Partitions*", Copyright © 2011 Storage Switzerland, Inc., 3 pages.

$EMC^2$ White Paper, "*Automating Root-Cause Analysis: EMC Ionix Codebook Correlation Technology vs. Rules-Based Analysis*", Technology Concepts and Business Considerations, Copyright © 2001, 2005, 2009 EMC Corporation, Nov. 2009, 12 pages.

$EMC^2$, "*EMC Smarts Application Connectivity Monitor. Ensure the Availability of Critical Business Applications in Your Virtualized Data Center*", Data Sheet, Copyright © 2012 EMC Corporation, 2 pages.

$EMC^2$, "*EMC Smarts Business Impact Manager. Map Business Services and Processes to the Infrastructure in Your Virtualized Data Center*", Data Sheet, Copyright © 2012 EMC Corporation, 2 pages.

$EMC^2$, "*EMC Smarts Multicast Manager. Management That Enables Service Assurance for Next-Generation Multicast Networks*", Data Sheet, Copyright © 2012 EMC Corporation, 2 pages.

$EMC^2$, "*EMC Smarts Network Configuration Manager. Model-based and Automated Compliance, Change, and Configuration Management for Networks*", Data Sheet, © Copyright 2012 EMC Corporation, 4 pages.

$EMC^2$, "*EMC Smarts Network Protocol Manager. Management That Enables Service Assurance for Complex Routing Protocols*", Data Sheet, Copyright © 2012 EMC Corporation, 2 pages.

IBM Software, "*The Manager of Managers for Today's Instrumented Business and Technology World. Managing Interconnected Business, IT and Network Infrastructures With IBM Tivoli Netcool/OMNIbus*", © copyright IBM Corporation 2011, 8 pages.

Kudo et al., "*Root Cause Analysis for Supporting Fault Identification*", Hitachi IT Operations Analyzer, Hitachi Data Systems, Apr. 2010, 15 pages.

Logmatrix, NerveCenter, "*Monitoring Your Network*", Windows and Unix Version 5.1.06, Copyright, Portions © 1989-2011 LogMatrix, Inc., 204 pages.

RiverMuse ECM, "*The IT Operations Management Solution*", © Copyright 2012 RiverMuse, 6 pages.

RiverMuse, "*Products the IT Operations Management Solution*", retrieved from Internet: <https://www.rivermuse.com/products/> on Jul. 19, 2013, © 2013 RiverMuse Ltd., 2 pages.

SEC, "*SEC—Open Source and Platform Independent Event Correlation Tool. SEC—Simple Event Correlator*", retrieved from Internet: <http://simple-evcorr.sourceforge.net> on Jul. 19, 2013, 3 pages.

Splunk, "*Splunk 5.0.3. Splunk Tutorial*", Generated Jul. 8, 2013, Copyright © 2013 Splunk, Inc., 88 pages.

Notification of Transmittal of the International Search Report and the Written Opinion of the International Searching Authority, or the Declaration ; International Search Report and Written Opinion of the International Searching Authority for International Application No. PCT/US2013/047979, mailed on Oct. 23, 2013, 11 pages.

Notice of Allowance, dated Mar. 10, 2015, for U.S. Appl. No. 13/791,367, filed Mar. 8, 2013, 8 pages.

Non-Final Office Action, dated Sep. 11, 2014, for U.S. Appl. No. 13/791,367, filed Mar. 8, 2013, 10 pages.

International Preliminary Report on Patentability, dated Jan. 8, 2015, for International Patent Application PCT/US2013/047979, 9 ages.

\* cited by examiner

NETWORK MONITORING AND DIAGNOSTICS

CROSS-REFERENCES TO RELATED APPLICATIONS

The present application is a non-provisional of and claims the benefit and priority under 35 U.S.C. 119(e) of U.S. Provisional Application No. 61/665,190, filed Jun. 27, 2012, entitled NETWORK MONITORING AND DIAGNOSTICS, the entire contents of which are incorporated herein by reference for all purposes.

BACKGROUND

The present disclosure relates to management of networks, and more particularly to techniques for monitoring a network and intelligently diagnosing network problems.

The frequency with which issues occur in any deployed network only increases as the networks grow larger and larger. Issues range from bad hardware and misbehaving devices to software bugs in the switches or routers, and the like. In a typical network deployed today, the large volume of messages (e.g., log messages) generated, the complexity of the issue, and the criticality of providing high availability make it very difficult for a network administrator to monitor and maintain the network.

BRIEF SUMMARY

Embodiments of the present invention provide various techniques for monitoring a network and intelligently diagnosing network problems.

In a typical network deployed today, the volume of messages (e.g., log messages) generated is so large that it is near impossible for a network administrator to monitor all these messages manually and react or take corrective actions in response to the messages in a timely manner. Further, network administrators typically do not have deep-enough knowledge of the way switches and routers work and are thus not be able to make the right conclusion about the source or root cause of the problem. Further aggravating the problem is the fact that events (and hence logs) in a large network may have a complex cause-effect relationships and as a result it is a very time consuming task even for an expert to identify fundamental issues among numerous observed symptoms when the issues happen.

In many instances, the data that is needed for diagnosing a problem is not collected on time. The amount of diagnostic data that is generated is usually such that it cannot be easily analyzed without time intensive and labor intensive means. Many times the expertise needed to analyze the data to identify a problem is not available and/or not centralized. This further adds to the time required for diagnosing a problem, leading to significant downtime.

Furthermore, in many instances, the network administrators or software modules running for diagnosing problems in a network can only recognize and react to known problems in the system and require a-priori knowledge of the symptoms of the events in the system that may lead to errors.

According to some embodiments of the present invention, techniques are provided for automated monitoring and diagnosis of a network comprising one or more devices.

In some embodiments, techniques are provided for gathering network information, analyzing the gathered information to identify correlations, and for diagnosing a problem based upon the correlations. The diagnosis may identify a root cause of the problem. In some embodiments, one or more recommendations may be provided for taking preventative or corrective actions for the problem.

In one embodiment, techniques are provided for receiving, by a device, diagnostic data for a network system. The diagnostic data is then analyzed to identify a problem. Information is then output related to the problem. In some embodiments, the analysis of the diagnostic data may comprise determining a set of events based upon the diagnostic data and determining a set of attributes for each event in the set of events. The set of attributes determined for an event may include, for example, location information indicative of a location in a network topology where the event occurred, time information indicative of a time when the event occurred, semantic information indicative of one or more categories associated with the event, and the like.

In some embodiments, the analysis may include determining causal distances between the events in the set of events based upon the set of attributes, wherein the causal distance determined between any two events is indicative of a probability that the two events are directly related to each other, clustering the events in the set of events into a set of groups based upon the causal distances, and generating a group hierarchy based upon the set of groups.

In certain embodiments, a computing device comprising one or more processing units may be configurable to determine a first event from information, allocate a first event to a first cluster, the first cluster is from one or more clusters of events, based on a set of attributes for the first event, the set of attributes including, location information indicative of a location in a network where a first event occurred, and time information indicative of a time when the first event occurred in a network, and determine a set of attributes for the first cluster, and rank the first cluster against the other clusters from the one or more clusters of events based on the set of attributes for the first cluster. The set of attributes for the first event may also include one or more categories indicating information associated with the first event, wherein the one or more categories comprises one or more of a hardware error category, a software error category, a performance category, a permissions category and/or a topology category.

In some embodiments, the set of attributes for the first cluster may be indicative of a relationship between a plurality of events from the first cluster. The relationship between the plurality of events from the first cluster may be known or unknown prior to a formation of the relationship. The formation of the relationship may be formed at the time of the formation of the cluster and may be updated each time the cluster is updated with a new event or new information.

In certain embodiments, the first event is one of a raw event, a derived event or a topology event. The network may include a topology of one or more network level nodes in a network topology and/or device level nodes in a device topology.

In certain embodiments, the computing device may determine a distance between the first event and the first cluster, wherein the distance determined between the first event and the first cluster is indicative of a probability that the first event and the first cluster are directly related to each other, and allocate the first event to the first cluster if the distance is below a distance threshold. The determining the distance between the first event and the first cluster may include determining, by the one or more processing units, a shortest distance between the first event and each of one or more events from the first cluster based upon a set of attributes associated with the first event and each event of the one or more events from the first cluster. In one implementation, the one or more events from the first cluster are the events that occurred in a past pre-determined period of time.

In certain embodiments, determining a set of attributes for a first cluster may include determining, by the one or more processors, a goodness of the first cluster, the determining the goodness of the first cluster indicates how closely related the events of the first cluster are to each other, and ranking the first cluster against the other clusters from the one or more clusters of events is based on determining, by the one or more processors, a ranking vector for the first cluster based on a number of events in the cluster and the goodness of the first cluster.

In certain embodiments, the ranking of the one or more clusters of events comprises ranking, by the one or more processors, the one or more clusters of events for each severity level associated with the one or more events from the one or more clusters of events. The computing device may further comprise providing one or more events from the first cluster for displaying, by the one or more processors, through a user interface, if the first cluster is ranked amongst a pre-determined number of cluster of events to be displayed.

In certain embodiments, the first cluster may include a most significant event in the cluster, wherein the most significant event in the first cluster is an event with an earliest timestamp amongst the events of the first cluster. The one or more attributes of each cluster may also include a timestamp of a last event added to the cluster. The first cluster may be removed from memory if the timestamp of the last event added to the cluster is older than a time threshold.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details. The figures and description are not intended to be restrictive.

According to some embodiments of the present invention, techniques are provided for automated monitoring and diagnosis of a network comprising one or more devices. In some embodiments, techniques are provided for receiving and gathering network information, analyzing the gathered information to identify correlations, and for diagnosing a problem based upon the correlations. The diagnosis may identify a root cause of the problem. In some embodiments, one or more recommendations may be provided for taking preventative or corrective actions for the problem.

In some embodiments, techniques are described for live and automated monitoring of a network with intelligence to help an administrator recognize an issue immediately once it happens. In one embodiment, a correlation engine is provided that correlates events as observed from various network elements and groups and consolidates them based on how closely related they are to each other. This correlation engine may work cooperatively with several other components to provide a network administrator's tool (referred to as "Network Analytics") that can be used to monitor a network, and track and report issues live. The tool may also provide automated solutions for identified issues. In this manner, in some embodiments, the tool may provide automated instructions for reacting to network issues. These reactionary measures may include but are not limited to performing a work-around, applying a patch, recommending a solution or even simply collecting data, when an issue is identified. The tool may be implemented as a Network Analytics module and provides users (e.g., customers) a way to manage large networks efficiently and to identify and resolve issues as soon as they happen.

Figure 1:
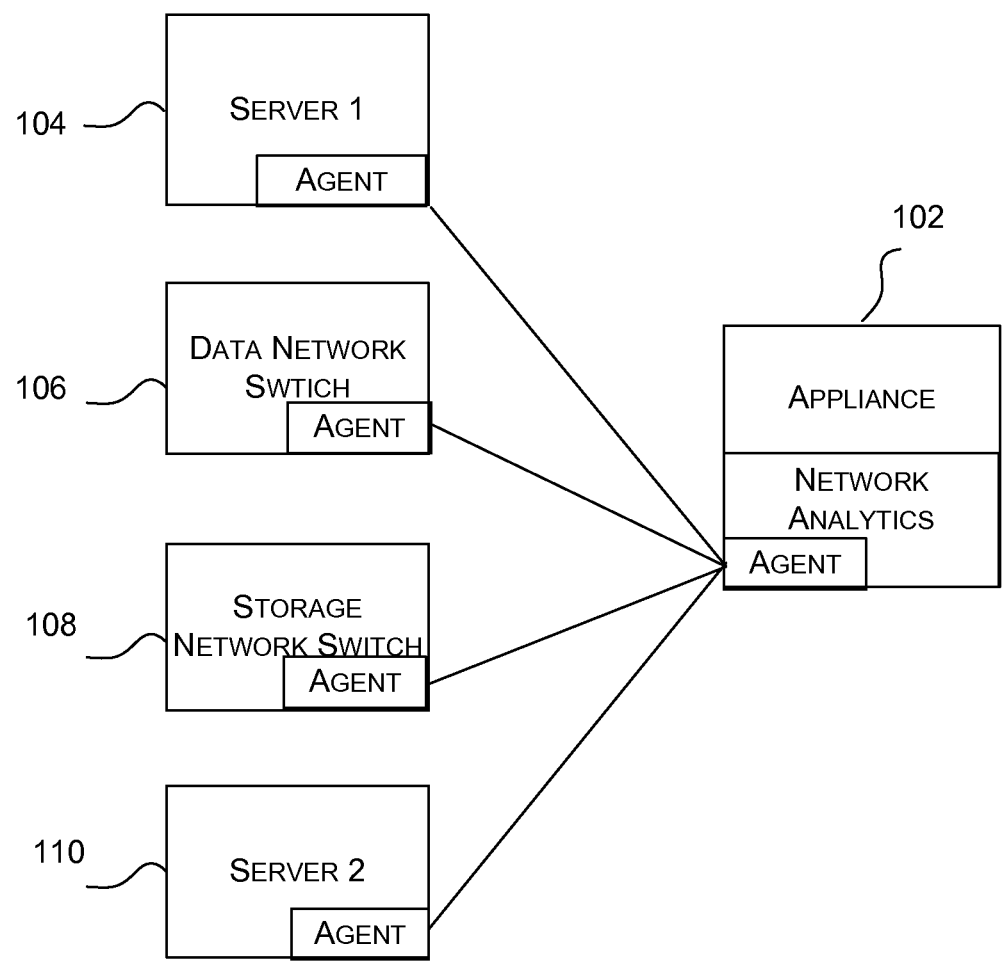
FIG. 1 is a simplified block diagram of a network environment that may incorporate aspects of the current disclosure.

FIG. 1 depicts a simplified high-level overview of a general deployment scenario for a Network Analytics module according to some embodiments of the present invention. The Network Analytics module may reside as a software or firmware module or a combination thereof on a standalone diagnostics appliance system 102 or any computer system in a network. In the embodiment shown, a network device such as a server 104 (or 110), data network switch 106, storage network switch 108, or any other device on the network may have an agent that is responsible for collecting information and sending it to the Network Analytics module. The agent may collect data generated by other modules co-located on the same device as the agent or may the agent may itself collect and/or generate information to send to the Network Analytics module. For example, the agent may run switch level diagnostics and health checks for hardware, system, network and/or software issues to generate information.

In one embodiment, the Network Analytics module is configured to receive data from one or more agents from one or more network devices. The information received from the agents may comprise one or more events. The communication between the agents and the Network Analytics module may be facilitated using a variety of techniques. In some embodiments, the communication channel could be through different physical medium, over different transport/application protocols depending on what data is collected and may also depend upon where the Network Analytics module is located.

In addition to receiving data from agents, the Network Analytics module may also receive data from other sources. For example, in some embodiments, there may be network level diagnostics and health monitoring tools, not necessarily co-located with the Network Analytics module, providing additional data. All these events from different sources may be received by the agent at the Network Analytics module and analyzed to detect potential problems in the network.

Figure 2:
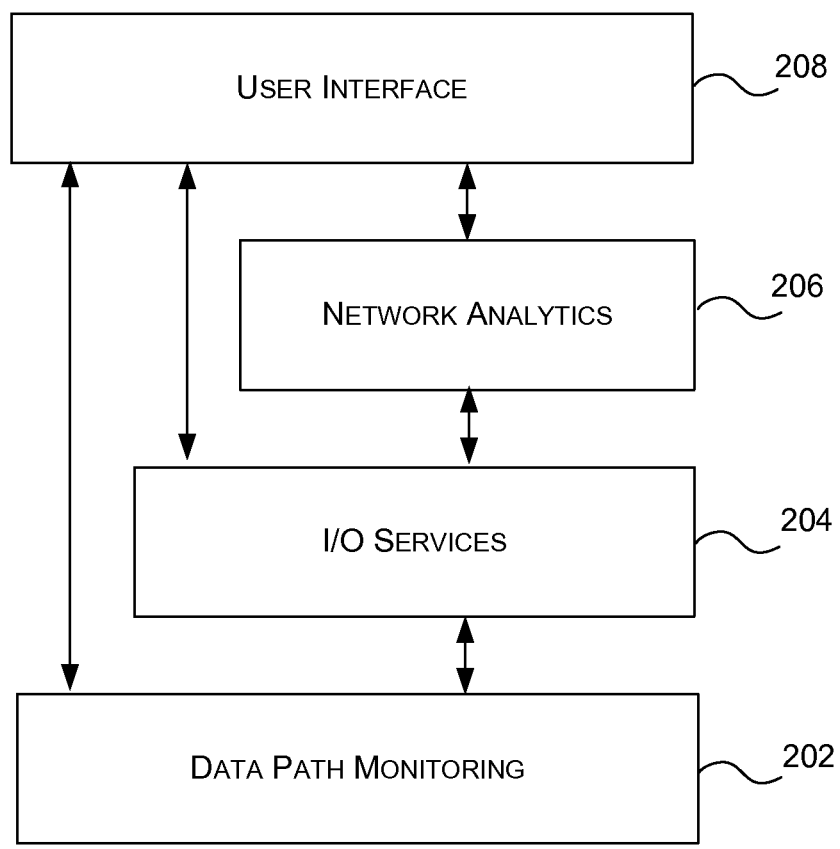
FIG. 2 depicts a simplified block diagram showing modules of a Network Appliance of FIG. 1.

FIG. 2 is a block diagram illustrating software components of an embodiment of the Network Appliance 102. Block 202 is the User Interface (UI) for a network appliance. The data path services 202 provides inline service for monitoring and switching functionality of the network appliance as a switch as the traffic passes through the network appliance. The I/O services 204 may derive context out of the traffic flowing through the network, such as communication exchanges and Logical Unit Number (LUN) information and provides statistics on this data. The Network Analytics component 206, as discussed herein, provides monitoring of the network and automated identification of potential issues. The UI 208 may provide an interface for the user to adjust the working parameters for the data path services 202, I/O services 204, and network analysis and for taking remedial actions based on information provided by the UI 208.

Figure 3:
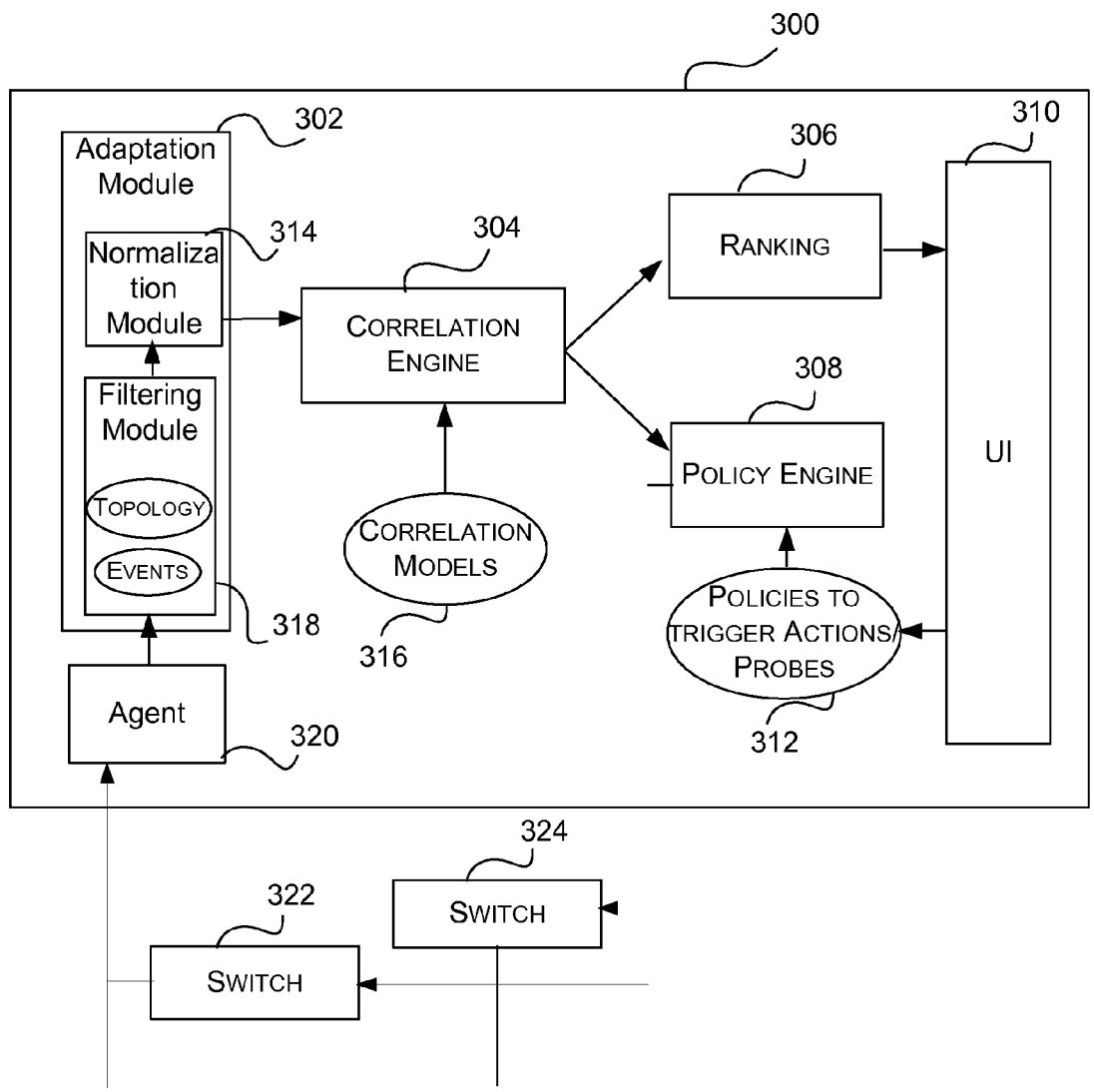
FIG. 3 provides an overview of architectural blocks of Network Analytics tool according to an embodiment of the present invention.

FIG. 3 provides an overview of architectural blocks of Network Analytics tool according to an embodiment of the present invention.

The adaptation module 302 is a data generation, collection and adaptation component that receives information from various sources and provides the correlation engine with event and topology information. The adaptation module 302 may filter information received from the network for event and topology information, normalize the data from various sources and also tag the events and topology information with attribute information related to the event, based on the information received. In one implementation, the adaptation module 302 receives information from the network through an agent 320 running on the device.

The adaptation module 302 may have a filtering module 318 for filtering information received from the network or collected locally through the agent 320 for event and topology information. In one embodiment, the filtering module 318 may filter event information from the information received at the adaptation module 302.

Event information may include raw events or derived events. An example raw event may comprise of a failure of a networking ASIC on a port in the network topology. On the other hand, an example derived event may be an event derived by monitoring the network traffic. An example of a derived event may include determining or estimating the latency or the bandwidth of a network link by monitoring the traffic on the network link of the device.

While in some embodiments only raw events, such as failures might be of interest to the user and the scalability of the algorithm may govern that only raw events be reported to the engine, sometimes derived events are important too, to establish relationship between a root cause and a symptom. What events get reported may be configurable based on filters that are adjustable at run time and are changeable from the Network Analytics module 300 itself using the user interface 310, for example, upon user request or based on automatic rules.

Topology information may include network topology and device topology. The network topology may include network level nodes connected to the network in an interconnected system. Network level nodes may include various devices such as data network switch 106, storage network switch 108, and one or more servers (104, 110). The device topology may include various components and configurations within the various network level nodes, such as the components of the example device shown in FIG. 11 and FIG. 12, and may be referred to as device level nodes. For example, hardware components, such as processing units, line cards, networking ASICs, etc. of a computing device connected to the network may all comprise the various device level nodes. Therefore, the network topology of the network level nodes and the device topology of the device level nodes of each of the network level nodes in the network may together define the topology of the system.

Topology information may be received from agents running on network level nodes in the network. In one embodiment, the various agents executing on the various network level nodes in the network collect network and device topology information, periodically or upon changes within the topology, and send the topology information to the Network Analytics module 300. An example of a change in the topology may include migration of a server or change in components of a device. In another embodiment, the adaptation module 302 may periodically send a message to the various agents in the network, residing on the various network level nodes, for requesting updated information about the network topology. In one exemplary implementation, the adaptation module 302 sends a broadcast message to all the neighboring nodes in the network. The agents residing at the various nodes may respond with a message that may comprise topology information.

The adaptation module 302 may also comprise a normalization module 314 for normalizing the wide range of data formats that may be supported in a network. The normalization function allows correlation of events from many different sources. The data may be collected from one or more network level nodes such as network devices provided by one or more vendors. In some embodiments, the data received or collected from the various sources may be first normalized or changed to a common format prior to sending the information to the correlation engine 304. In this manner, various different sources providing data in various different formats may be enabled for analysis without having to make a change to the correlation engine 304. This enables the correlation engine 304 to be isolated from changes to data sources, such as the various nodes and changes to the format of the received data by working on a normalized and structured data format. Data from different sources may be run through the respective data adapters, as described above. However, in an alternate embodiment, the agent located either at the data source may transform the data into the standard format acceptable by the correlation engine 304 before dispatching the information to the adaptation module 302.

The normalization module 314, may also tag the events or generate additional information related to the criticality or severity level of an event, during the process of normalizing the information for the correlation engine 304. The normalization module 314 may generate additional information, where deriving correlations using the event may require additional information that may not be provided by the data source in some instances.

The correlation engine 304 generates correlations between events received from the adaptation module 302. The correlation between events represent known or unknown relationships between events. In one implementation, the correlation engine 304 groups or allocates events into cluster of events such that events in the same cluster are either indicative of a common root cause or related to each other by a cause-effect chain. To identify such cause-effect relationships, the correlations processing may use the domain knowledge, and topology knowledge.

The domain knowledge helps determine how any two events are related to each other. The events are analyzed for clustering using a set of attributes associated with each event, such as time information, location information and other characteristics of the event. The location information is indicative of a location in a network where the event occurred. The time information is indicative of a time when the event occurred. And other characteristics include may include one or more of hardware error category, software error category, performance category, permissions category and/or topology category.

The event is allocated to a cluster that is most similar to the set of attributes for the received event. If the event is distinctively different from the current clusters, a new cluster may be formed using the received event.

The clustering of events with similar attributes creates clusters that have their own set of attributes representative of the collective attributes of their member events. The set of attributes of the clusters may be indicative of the relationship between the events in the cluster. These set of attributes for the clusters may also include information about the cluster, such as the number of events in the cluster, criticality of one or more events from the cluster, relative distance amongst the critical events of the cluster, most significant event present in the cluster, wherein the most significant event in the cluster is an event with the earliest timestamp amongst critical events of the cluster, and a timestamp of a last event added to the cluster.

The clusters represent relationships between events that may be dynamically derived from the attributes of the events, such as time information, location information and other characteristics or the attributes of the cluster itself. In some instances, the Network Analytics module may have no prior knowledge of these relationships until the relationships are formed (i.e. clusters) and the set of attributes of the cluster are determined. Therefore, the Network Analytics module may discover and learn these relationships, dynamically, at run time, as new data about the network is received.

To help the correlation engine 304 correlate events effectively, the correlation engine 304 maintains topology information that includes the network topology and device topology, as discussed previously. The correlation engine 304 may use the location information along with the topology for performing deep correlations of events in a network. The network topology defines how the network level nodes are interconnected and the device topology defines how various components within a network level node, such as a switch are interconnected. The combined network and device topology provides the correlation engine 304 information to perform deep level analytics.

For example, the correlation engine 304 may be able to correlate failures associated with a very specific device level node, such as a networking ASIC from a particular vendor installed in a variety of network level nodes from various different vendors across the network. Such deep correlations allow the system administrator or the policy engine to take immediate remedial steps in identifying and fixing the problem. Various techniques for performing correlations are discussed in greater detail in later figures.

In one embodiment, the correlation engine 304 generates correlations based on correlation models 310. Correlation models 316 may be stored locally, remotely or generated by the Network Analytics module 300. In one embodiment, the correlation engine 304 identifies relationships between events based on correlation rules from correlation models 316, provided as input to the algorithm in the form of a rules database, updateable at run time.

In one embodiment, a ranking engine 306 ranks the clusters based on the set of attributes associated with each cluster and the potential criticality of each cluster to the health of the network system. Ranking may be used to help a system administrator pay attention to the most important issues occurring in a network at any given point in time. Ranking may be used among clusters to prioritize one cluster over another. The rank of a cluster might be based on a number of criteria such as the number of critical events contained in the set, number of devices affected by the issue, the time the issue has spanned, the goodness of the cluster, etc. Thus, it might be helpful to provide a criticality level for each event that is input to the user. The rank metric may be either continuously updated as the cluster emerges or evaluated at data presentation time. Events within a cluster may also be ranked or most critical events may be selected so that the user can pay attention to important events in an identified set.

The ranking module 306 may rank clusters, for instance, as one of the top 10 clusters to present to the user or the policy engine, based on the attributes of the cluster, such as the number of events in the cluster, the criticality of one or more events from the cluster, relative distance amongst the critical events of the cluster, most significant event present in the cluster, wherein the most significant event in the cluster is an event with the earliest timestamp amongst critical events of the cluster, and a timestamp of a last event added to the cluster.

One of the advantageous aspects of the invention may include ranking a cluster of events as a potential problem within a network without even knowing the problem or nature of the problem, a priori. In other words, the clusters represent relationships between events that may be dynamically derived from the attributes of the events, such as time information, location information and other characteristics or the attributes of the cluster itself. In some instances, the Network Analytics module may have no prior knowledge of these relationships until the relationships are formed (i.e. clusters) and the set of attributes of the cluster are determined. Therefore, the Network Analytics module may discover and learn these relationships, dynamically, at run time, as new data about the network is received. The ranking of these clusters, in essence, provides a ranking of the various discovered (previously unknown) and known relationships in the tree of clusters.

For example, agents running at a network level node or a group of nodes may start issuing events to the Network Analytics module 300 based on the increasing rate of traffic and slowing pace of throughput at the network level node or group of nodes. Even though, the network level node or group of nodes may be functionally ok according to traditional diagnostics test for testing throughput, bandwidth and latency of the link, the correlation engine 304 may correlate the events and the ranking module 306 may rank the cluster as a top 10 cluster to present to the user or the policy engine 308 based on the number of events, the time stamp of the events, the location of the events in the network, etc. The condition signified by the cluster may present a potential failure condition in the making that may bring down a potentially critical section of the network, if the failure occurs. Embodiments of the invention enable remedial actions by a policy engine 308 or a system administrator well before the potential condition may cause a catastrophic failure in the network.

Figure 10:
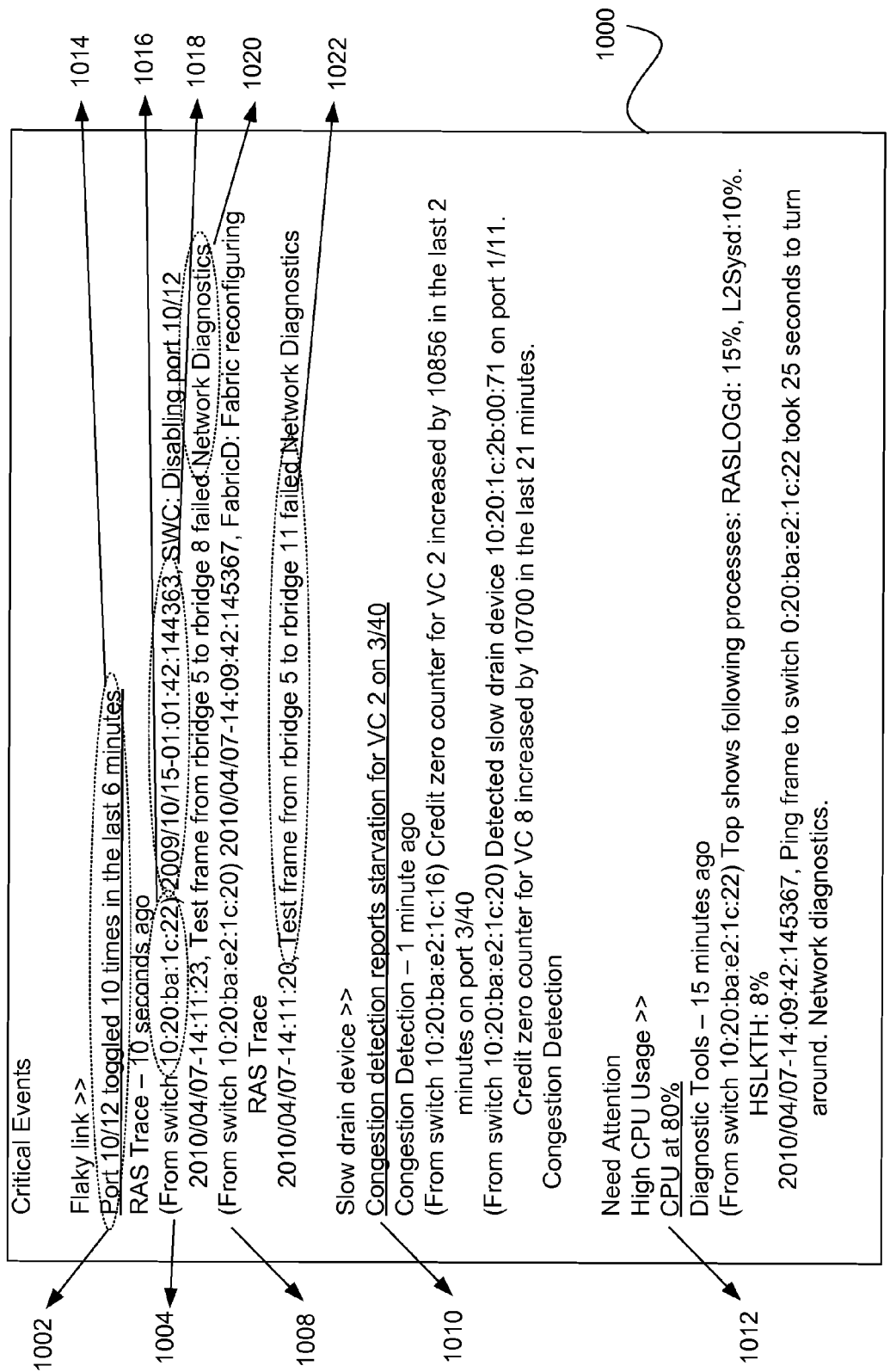
FIG. 10 is an example of a UI display for the Network Analytics tool.

The user interface (UI) 310 provides data presentation and visualization of the network health, as also seen in FIG. 10. The UI 310 may make use of the relative rankings among the clusters to present to the user top issues occurring in the network at any given point in time. These top issues may include both known and unknown issues identified by the Network Analytics module as potential problems in the network. In one implementation, only representative events from the cluster of events may be displayed to the user for further analysis. Additional analysis and visualization facilities may be provided with the UI 310 to help the user visualize the health of the network and analyze and root cause any potential problems quickly.

In addition to providing analytical tools to the user for visualization, the UI 310 may also provide the user with a means for adjusting parameters policy parameters, deploying probes, or running additional diagnostics tools. For example, in response to one or more of the displayed events representative of system health, the user may choose to switch the network analytics system to a diagnostics mode. In one embodiment, the diagnostics mode may enable more detailed information gathering and analysis. In another embodiment, additional probes may be deployed or activated at the agents residing at the network level nodes for providing more detailed information on the health of the network.

As a means of extendibility, the information displayed by the UI 310 may also enable a user to identify an event set as a potentially repeatable pattern or issue and annotate it with recommendations or define automated actions to be taken. This recommendation/action may be entered into the policy database to be activated later by the policy engine 308 if the same pattern occurs in future.

In some embodiments, a policy engine 308, which may be co-located with the correlation engine, is responsible for identifying a group of emerging events as indicative of a known issue or a configured condition and take some actions based on that. The action could be asking for more or less data by deploying/removing data collection probes dynamically or it could be a work around for a known issue, collecting support saves or performing any user defined action like e-mailing the administrator.

Rules governing the actions to be performed by the policy engine 308 when a particular issue happens or when a symptom is observed may be provided as a separate policy database 312 that may be updateable at run time. Recommendations, work-arounds, patches, etc. may be distributed to known issues to the network level nodes on an as-needed basis simply by updating this policy database file.

Information may be stored about known issues and emerging patterns matched with known issues. A network administrator may use the UI 310 to make the engine "learn" an event set. This may include storing information about the event and a policy entry for the event set specifying the action to be taken next time it happens. An emerging cluster may be computationally matched with a known pattern. In some embodiments, a problem may be matched to a single event only.

The UI 310, or the policy engine 308 may trigger deployment or activation of probes co-located on the network level nodes with the agents for collecting and characterizing various network events. Probes are code modules that are run by the agents in network devices such as switches to collect data that might help the analysis algorithm correlate events better. Probes do not necessarily have to result in additional data collection since the probe logic might be looking for certain conditions that are never met and hence no events may be generated. Probes may also be run in the data-path, on network processors, for example, to collect and analyze data frames, possibly by sampling them.

In some embodiments, a policy engine 308, based on the action policy, might send a request to the agents residing at the network level nodes to enable/disable probes, turn on/off data filters or take a remedial action like toggling a port or applying a patch.

Probes could be run as part of another functional module, simply to gain access to the state and events of the particular module. The probes themselves may be non-intrusive to the host modules hosting the probing logic and may not write into the module-owned memory. A probe may read a host network level node's state and also may maintain its own memory where it can maintain some state for the probing logic.

In some embodiments, the probes are light weight and may not require any persistent or high availability (HA) state in their private memory. Since they also do not write to the host module's memory, the probes could be attached to or removed from a host module that is running, without significantly affecting the state of the host module.

Figure 4:
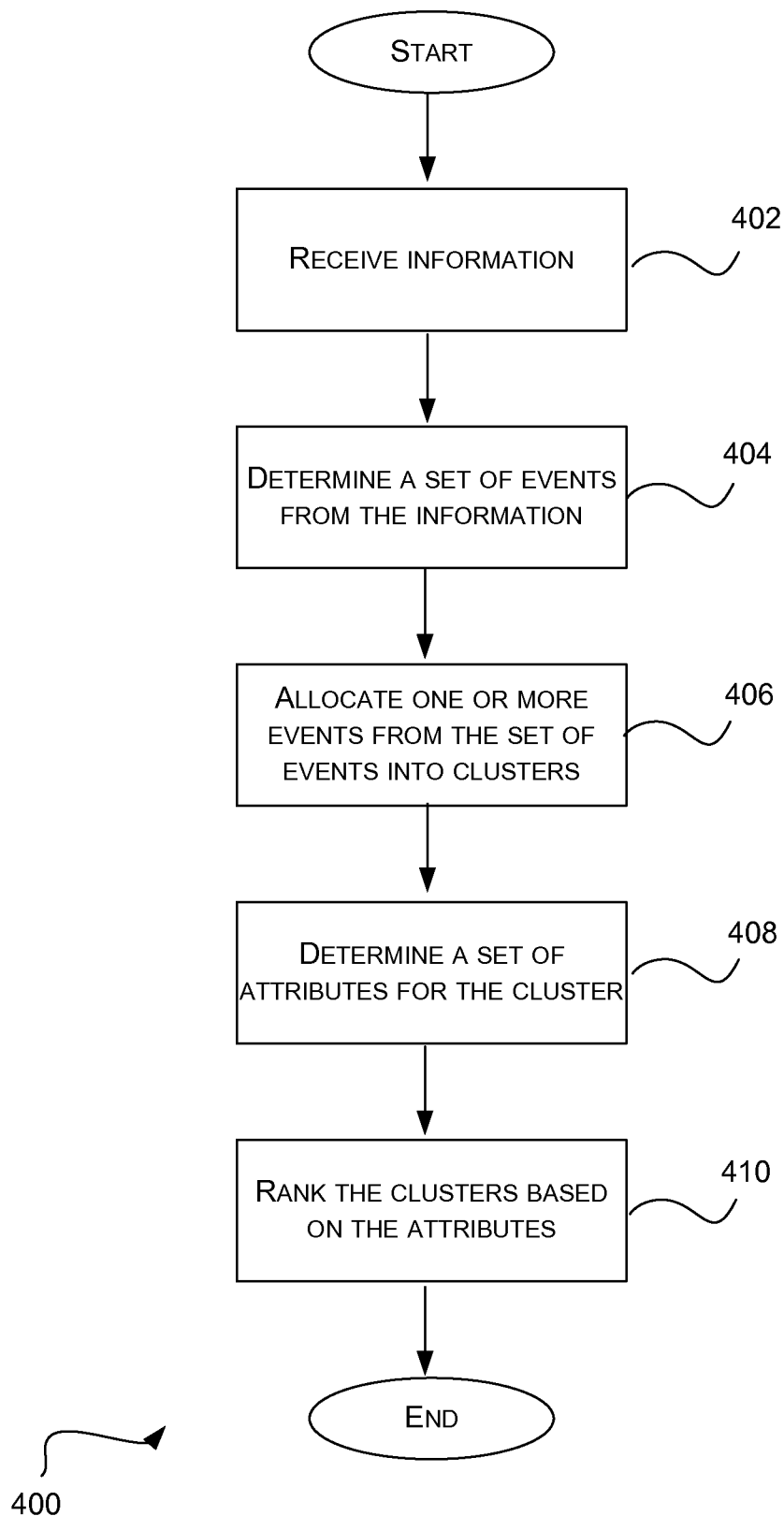
FIG. 4 depicts a flowchart illustrating a method for allocating events to clusters according to an embodiment of the present invention.

FIG. 4 is a flow diagram illustrating a method for allocating events to clusters according to an embodiment of the present invention. According to one or more aspects, any and/or all of the methods and/or method steps described herein may be implemented by components of the Network Analytics module 300 described in FIG. 3, and performed by the components of a network device such as FIG. 11 or FIG. 12. In one embodiment, one or more of the method steps described below with respect to FIG. 4 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 402, components of the invention, such as the Network Analytics module, receives information from the network. At Step 404, the Network Analytics module determines a set of events from the received information.

At Step 406, the Network Analytics module allocates an event from the set of events into a cluster of events based on a set of attributes associated with the event. The set of attributes associated with the event may include but are not limited to time information, location information and other characteristics of the event. The location information is indicative of a location in a network where the event occurred. The time information is indicative of a time when the event occurred. And other characteristics may include one or more categories indicating information associated with the event, such as hardware error category, software error category, performance category, permissions category and/or topology category. Allocation of an event to a cluster is discussed in more detail in the figures below.

At Step 408, the Network Analytics module determines a set of attributes for a first cluster from the one or more clusters of events. The set of attributes associated with the first cluster may represent a known or unknown relationship between the various events in the first cluster. At Step 410, the Network Analytics module ranks the first cluster from the one or more clusters against the other clusters based on the set of attributes for the first cluster. The ranking of the clusters amongst each other ranks the relationships of the events associated with the various clusters. In one embodiment, these relationships may be displayed to the user through a UI 310 for further action by the user.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 5:
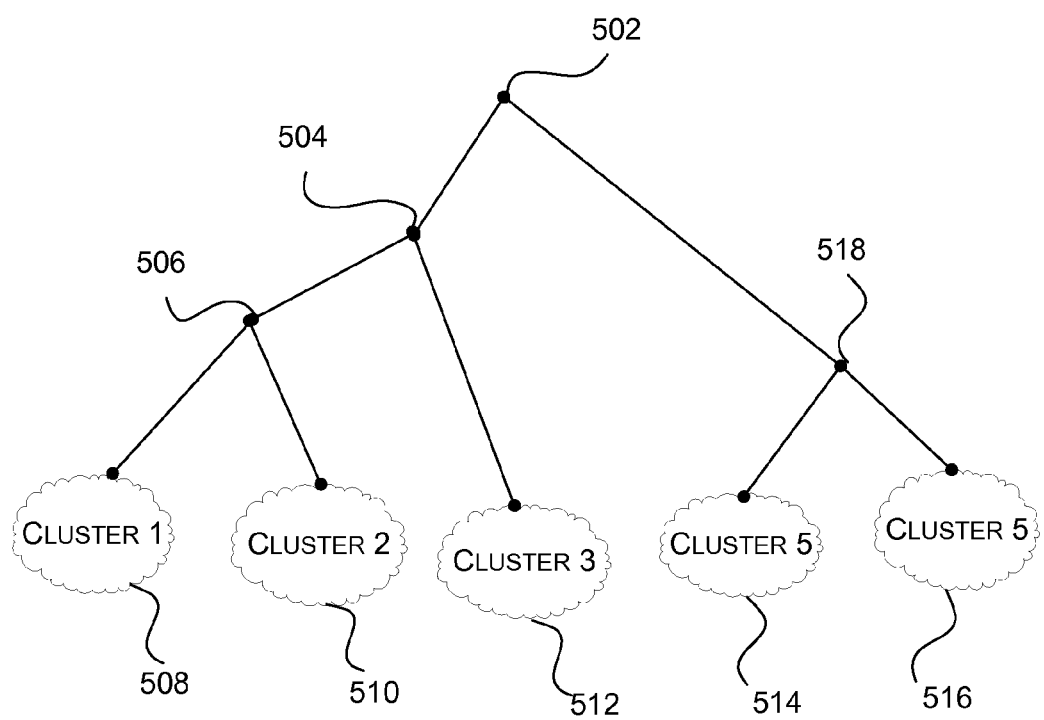
FIG. 5 depicts a database tree structure for maintaining clusters by the Network Analytics module.

FIG. 5 depicts a database tree structure for maintaining clusters by the Network Analytics module 300. For clustering of the events, events represent data points. Algorithms such as DBSCAN (density-based spatial clustering of applications with noise), Cobweb and other known techniques may be used in generating a tree for clustering of the events. As shown in FIG. 5, the tree structure includes a root node 502, intermediate nodes (504, 506 and 518) and leaf nodes (508, 510, 512, 514 and 516).

In one implementation, as shown in FIG. 5, the clusters of events are depicted at the leaf nodes (508, 510, 512, 514 and 516) of the tree. Each node above the leaf nodes may also represent a cluster. Such a parent cluster represents a cluster of events that includes union of the events from its children nodes. For example, node 506 represents a cluster that includes events from cluster 508 and 510, whereas node 504, represents a cluster that includes events from clusters 508, 510 and 512. Similarly, the root node 502 represents all events in the cluster tree. Each cluster in the cluster hierarchy represents a grouping of one or more events that may or may not be critical. Clustering algorithms may use a distance between the new event and the nodes of the tree for allocating events to any particular cluster. The distance between an event and a cluster indicates how closely the event is related to the cluster. Algorithms for determining the distance between events is discussed in further detail in FIGS. 7A, 7B, 7C and 7D.

Figure 6:
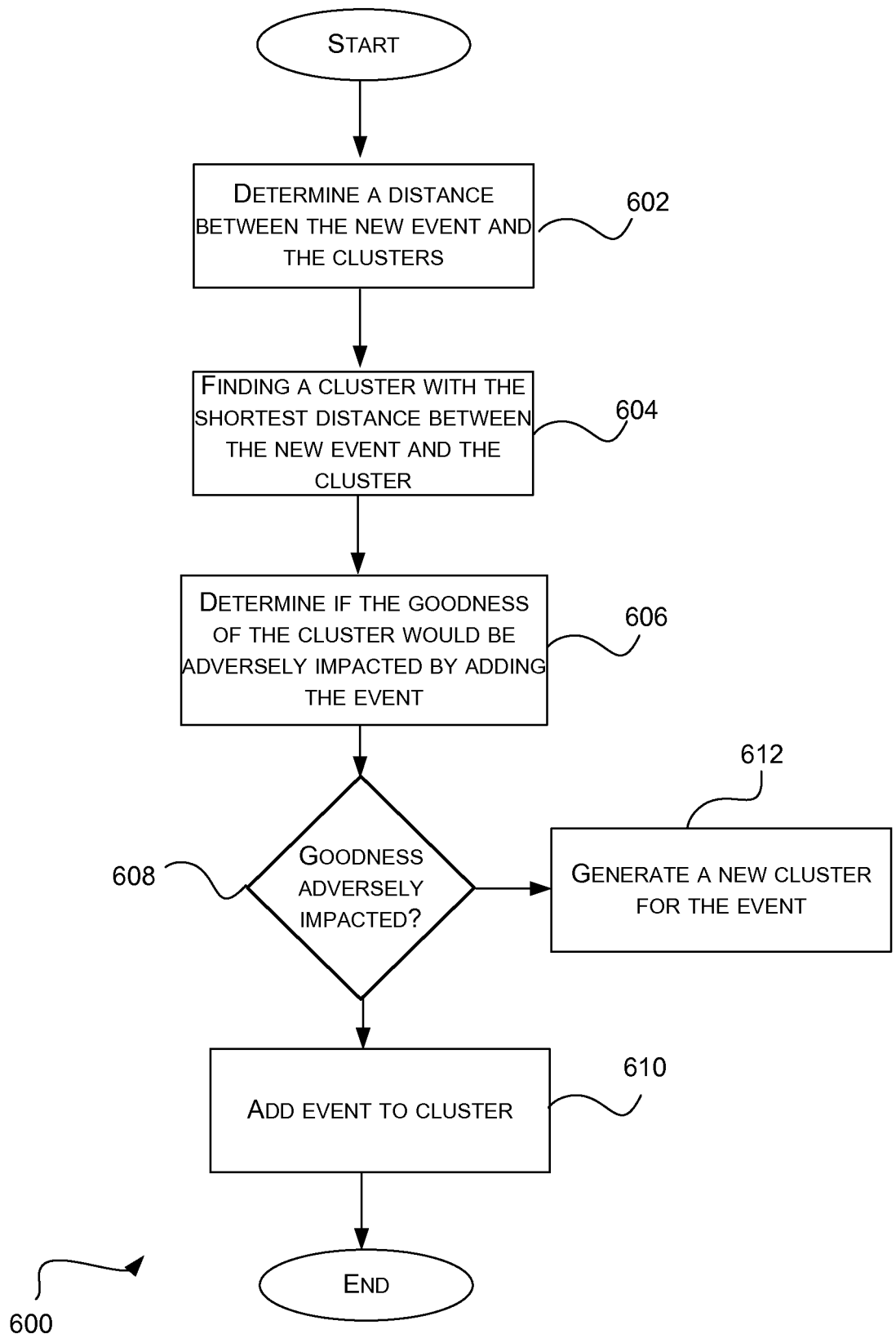
FIG. 6 depicts a flowchart depicting the process of adding an event to a cluster of a tree maintained by the Network Analytics module.

FIG. 6 depicts a flowchart depicting the process of adding an event to a cluster of a tree maintained by the Network Analytics module. According to one or more aspects, any and/or all of the methods and/or method steps described herein may be implemented by components of the Network Analytics module 300 described in FIG. 3, and performed by the components of a network device such as FIG. 11 or FIG. 12. In one embodiment, one or more of the method steps described below with respect to FIG. 6 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 602, the Network Analytics module determines a distance between the new event and the clusters in the tree. In one implementation, the distance between the new event and each cluster is determined by determining the smallest distance between the new event and each event of the cluster. In one implementation, the distance between the new event and only the events that may have arrived within a pre-determined timeframe before the arrival of the new event may be calculated, since recent events may be deemed more relevant. One implementation of determining the distance between two events is discussed in greater detail in FIGS. 7A, 7B, 7C, and 7D. In another implementation, a distance between the new event and a cluster is determined by determining the attributes of the event and the cluster and comparing the differences (or similarities) between the attributes of the event and the cluster. In this context, the distance may represent the difference (or similarity) between the event and the cluster.

At Step 604, the Network Analytics module finds a cluster amongst the one or more clusters with the shortest distance between the new event and the cluster. At Step 606, the Network Analytics module determines if the goodness of the cluster would be adversely impacted beyond a reasonable threshold by adding the event. Each cluster may maintain a goodness metric that indicates how closely the events of the cluster are related. The lower the goodness metric value the higher the probability that the vents of the cluster are related. One implementation of determining the goodness of a cluster is discussed in further detail in FIG. 9

At Step 608, if the Network Analytics module determines that the goodness of the cluster would not be adversely impacted beyond a reasonable threshold by adding the event to the cluster, at Step 610, the Network Analytics module adds the event to the cluster and updates the attributes of the cluster. The flowchart of FIG. 8, discusses one implementation for updating the attributes of the cluster. On the other hand, if the Network Analytics module determines that the goodness metric of the cluster would be adversely impacted beyond a reasonable threshold by adding the event to the cluster, at Step 612, the Network Analytics module generates a new cluster for the event, since the event is significantly distinct from all other clusters (and consequently events) in the tree.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

FIGS. 7A, 7B, 7C and 7D depict a network with several network level nodes.

Figure 7A:
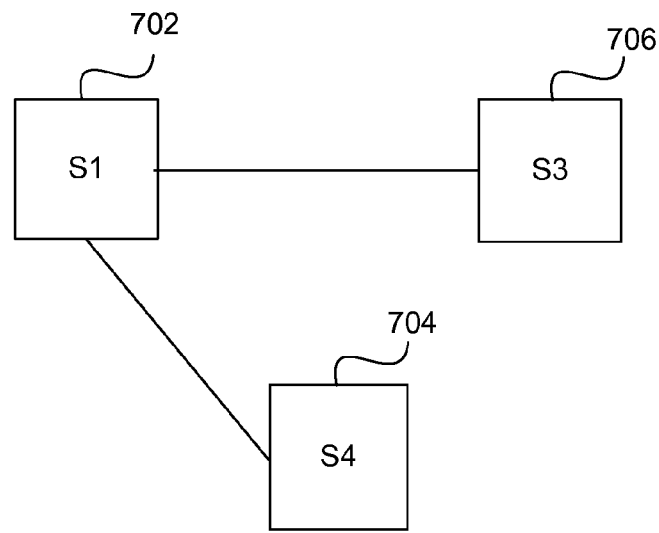
FIGS. 7A, 7B, 7C and 7D depict a network with several network level nodes.

FIG. 7A represents several network level nodes in a network connected to each other. Network level node—S1 702 depicts a first network switch, network level node—S2 704 depicts a second network switch and network level node—S3 706 depicts a third network switch.

Figure 7B:
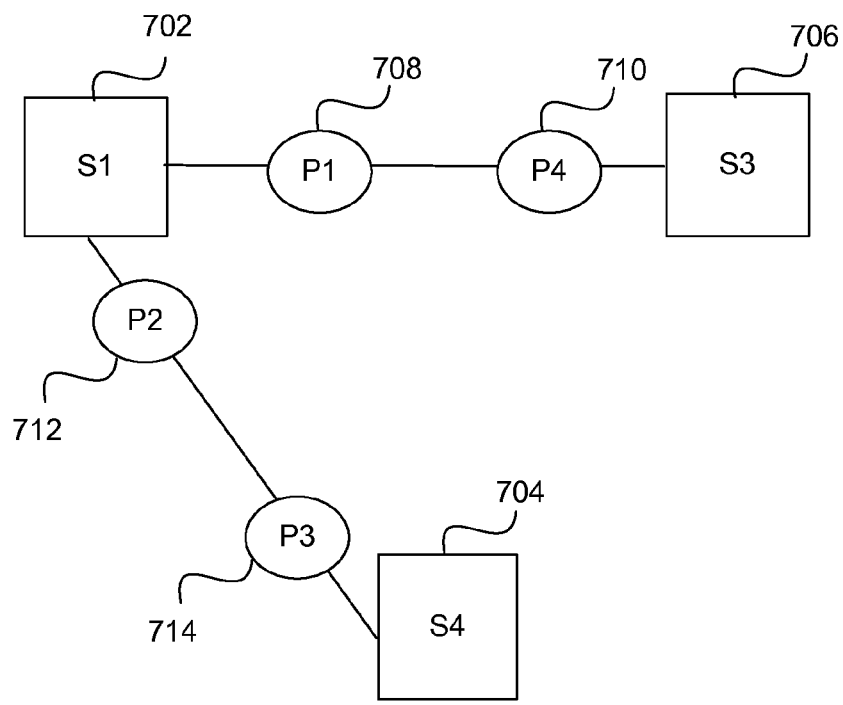

Now, referring to FIG. 7B, FIG. 7B further depicts ports associated with each switch. For illustration purposes only a few ports associated with each network switch are shown. However, a network switch may have many more ports. In FIG. 7B, network switch S1 702 has two ports, P1 708 and P2 712, network switch S2 704 has one port P3 714 and network switch S3 706 has one port P4 710 depicted.

Figure 7C:
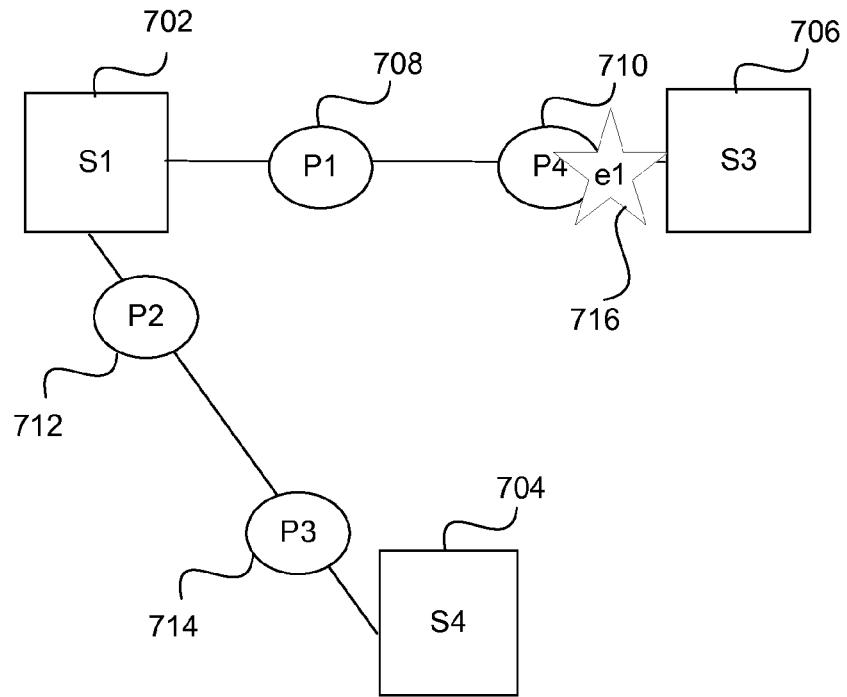

In FIG. 7C, depicts the same network from FIG. 7A and FIG. 7B at a first time t1. FIG. 7C additionally depicts an event e1 716 that occurs at port P4 710. As discussed previously, an event has may have a set of attributes associated with it and may include time information, location information and other characteristics associated with the event.

The location information is indicative of a location in a network where the event occurred. In FIG. 7C, the event e1 716 occurs at port P4 710. The location information about the event e1 may be tagged by network switch S3 706 or an agent running at the switch. The time information is indicative of a time when the event occurred. An example of the time when event e1 occurred may be 12/31/2012.16.43.287641, where 12/31/2012 represents the date, and 16.53.287641 represents the hour, minute and seconds delineated by periods. The time information about the event e1 may be time-stamped on the event information by network switch S3 706 or an agent running at the switch.

The event may have additional characteristics associated with the event, such as hardware error category, software error category, performance category, permissions category and/or topology category. The characteristics may also be tagged with the event information by the network switch S3 706 or an agent running at the switch. The characteristics of an event may be represented using tags. In one convention, the tags are a list of dot-delineated keywords, referred to as semantic tags. Examples of such keyword semantic tags include hardware.asic.crc, hardware.flash.*, performance.congestion, routing.route_absent, permissions.denied. The first word before the dot may represent a high level event category, whereas the subsequent words followed by subsequent dots represent finer granularity of detail about the categorical event.

For example, hardware.asic.crc may indicate to the Network Analytics module that a hardware failure occurred at the ASIC performed cyclic redundancy check (CRC) operation. Similarly, in another example, a tag label routing.route_absent may indicate to the Network Analytics module that the routing event occurred and that the network route does not exist. The associated location information and the time information will allow the Network Analytics module to determine the location and time at which the networking route was found to be absent. In one example implementation, if the Network Analytics module determines a number of routing.route_absent messages from approximately the same location and time, the Network Analytics module may automatically take remedial actions to affect reconfiguration of the network packets to avoid the route with the error and alert the System Administrator of the absent or failed routing link on the network.

Figure 7D:
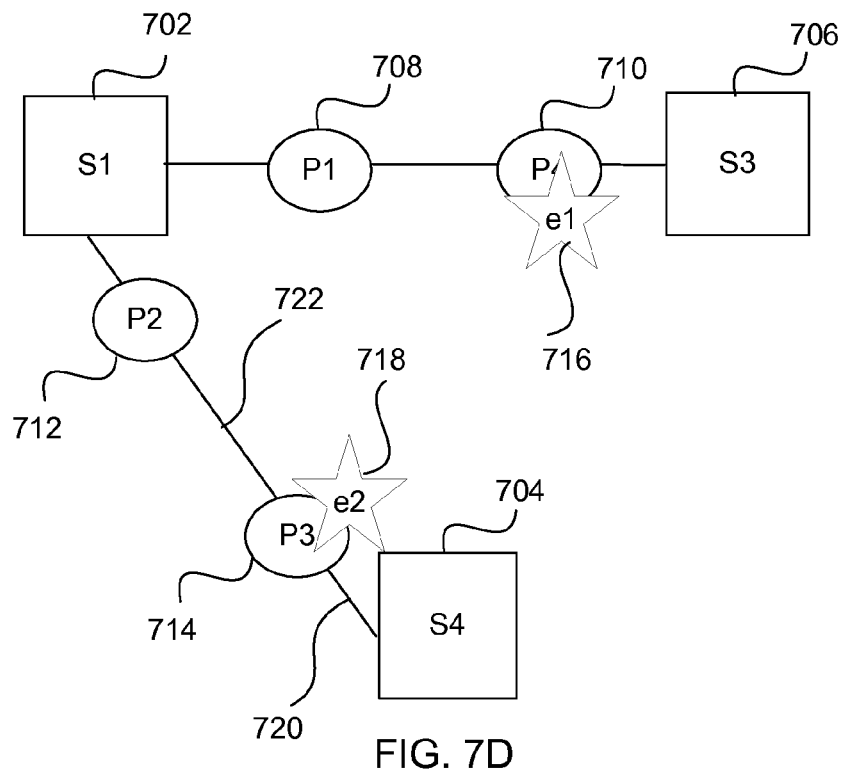

FIG. 7D, also depicts the same network as FIG. 7A and FIG. 7B, but at a second time t2 with an additional event e2 718 that occurs at port P3 714 at time t2.

The distance between any two events in the network represents how closely related the two events are. Furthermore, the distance captures the probability an event of a particular category can cause another event of the same category. In one embodiment, the distance for an event is calculated across different vectors and composited together to generate a final distance for any two events in the network. The different vectors for the distance, may include, but are not limited to the attributes of the events, such as the time information and the location information. Distance of an event may also represent additional vector information associated with each high level semantic category for the event. Examples of such semantic categories may include, but are not limited to, performance, hardware, routing event, or permissions.

Referring back to FIG. 7D, the lines connecting the ports to switches and the ports to ports may be referred to as edges. For example, edge 722 is a port-to-port edge, whereas edge 720 is a port to switch edge. The distance across each semantic category for any two events may be calculated across these edges. For instance, the distance for a hardware failure event at P3 714 and a hardware failure event at network switch S3 704 (not shown) along edge 720 may be negligible, since the port P3 is physically attached to network switch S3 and a failure at the port directly effects the functioning of the switch. However, the distance between a hardware failure event at port P3 714 and port P2 712, along edge 722, may be infinite or close to infinite, since it is highly unlikely that a hardware failure on two separate switches may have a causal relationship to each other.

On the other hand, a distance related to the performance semantic category for two events occurring at neighboring ports, such as port P3 714 and port P2 712, along edge 722, may have a direct and measurable relationship to each other. For example, the same traffic on the edge 722 may adversely affect port P3 714 and port P2 712 in a very similar manner. Therefore, the distance in the performance semantic category between events at port P3 714 and port P2 712, along edge 722, may be a finite number. In one embodiment, the distance between such neighboring ports may be calculated emphatically and used for neighboring ports under similar circumstances.

In one implementation, the Network Analytics module determines the causal distance between two events, such as e1 716 and e2 714, by determining the semantic distance between two network location at which the events occurred for each semantic category (equation 1), by determining the semantic match between the two events for each semantic category (equation 2), and compositing the semantic distance and the semantic match across each of the different categories to determine causal distance between the two events (using equation 3 and 4) for all categories.

In one implementation, the semantic distance between two potential network events occurring at two network locations for a semantic category may be represented by the following equation:

$$d(l_1,l_2)[c] = \min_{all\ paths}(\Sigma(i=1_{to\ n})d(Ei)[c],\qquad(1)$$

wherein, E1, E2 . . . En are edges in a specific path between the locations and n is the number of edges in the path, $l_1$, $l_2$ and are locations, c is a semantic category, E is an edge in the graph, d(E) represents the distance vector attached to the edge and d[c] represents the distance for category c in the distance vector.

To determine the semantic match between two events, such as e1 716 and e2 714, the Network Analytics module may perform a semantic tag comparison. In one implementation, the Network Analytics module considers the semantic tags associated with each event from the event information. As discussed previously, a semantic tag (T) is a set of dot separated keywords.

The semantic match between e1 716 and e2 714 for a semantic category may be represented by a vector containing one value for each semantic category and represented by the following equation:

$$e_1.e_2[c] = \Sigma_{i=1\ to\ m, Si[1]=c}(\Sigma_{j=1\ to\ n, Tj[1]=c}S_i.T_j),\qquad(2)$$

where event e1's semantic tags are {S1, S2 . . . Sm}, event e2's semantic tags are {T1, T2 . . . Tn}, Si.Tj=f(k), c is a semantic category, T[1] is the first word in the dot separated semantic keyword list in the tag T, such that the first k key words in both Si and Tj match but they differ in the K+1st key word and f(k) is a function of k (may be referred as K). Some of the keywords may be marked with a wildcard notation, such as an asterisk, and may match with any other key word in that position.

Now, that the we have the semantic distance between two potential network events occurring at two network locations for each semantic category and the semantic match between two network events for each of the sematic categories, the causal distance may be represented by:

$$d(e_1,e_2) = 1/\Sigma_{for\ each\ semantic\ category\ c}(e_1.e_2[c]/d(l_1,l_2)[c])\qquad(3)$$

The causal distance may be further adjusted using time at which e1 and e2 occurred, respectively, as shown by:

$$c(e1,e2) = A.(t_1-t_2)^2 + B.(d(e_1,e_2))^2\qquad(4)$$

where A and B are normalizing constants. In one implementation, A and B may be derived using empirical testing.

In the above description, the events are directly related to each other. However, in some scenarios two events may not be directly related but related through an intermediary event. For example, in a storage network, a first event may comprise a device that is unable to log into the storage network and a second event may comprise the storage network switch running at 100% CPU utilization. Seemingly, the first event and the second event may be considered as unrelated, until the third event comes along that indicates that the login queue at the network storage switch is backed up since the CPU is running at 100% capacity and cannot process the logins. Aspects of the disclosure help bridge these relationships by building trees at a cluster level, such as minimum spanning trees as discussed in more detail in FIG. 9.

Figure 8:
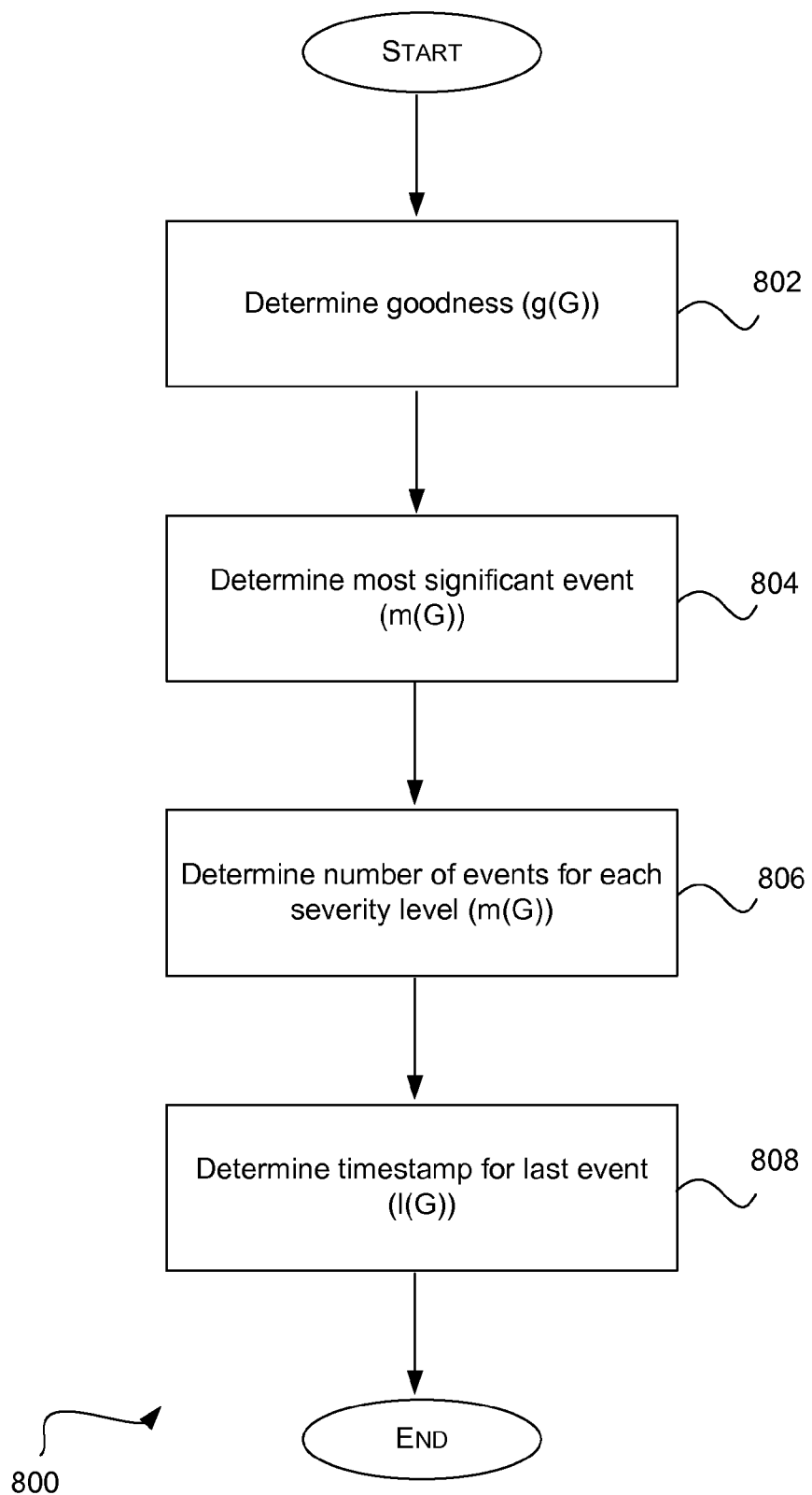
FIG. 8 depicts a flowchart for updating the set of attributes for a cluster.

FIG. 8 depicts a flowchart for updating the set of attributes for a cluster. According to one or more aspects, any and/or all of the methods and/or method steps described herein may be implemented by components of the Network Analytics module 300 described in FIG. 3, and performed by the components of a network device such as FIG. 11 or FIG. 12. In one embodiment, one or more of the method steps described below with respect to FIG. 8 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

Figure 9:
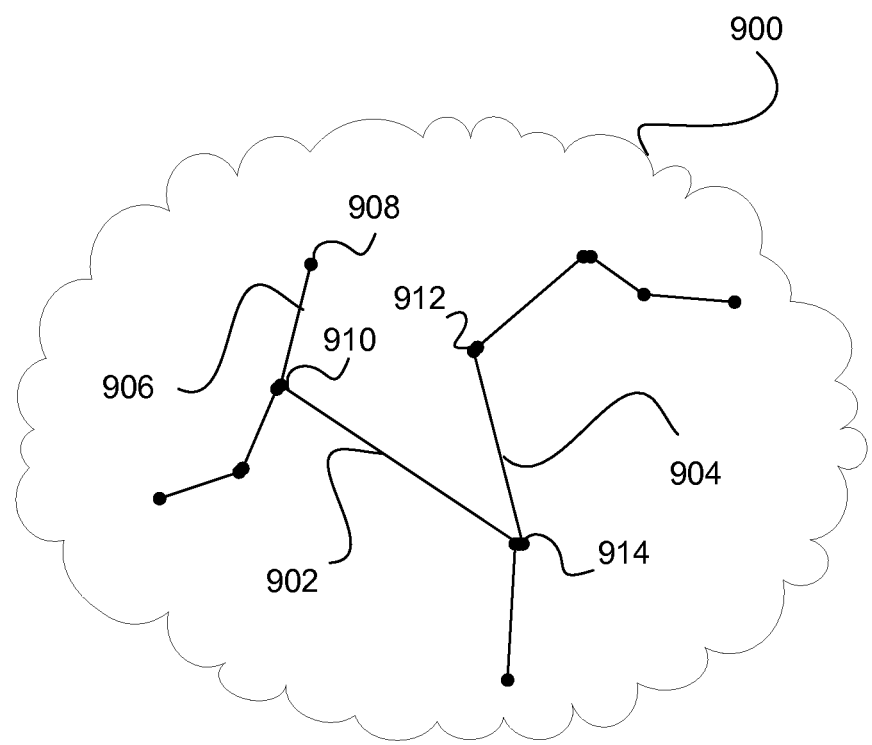
FIG. 9 describes an example cluster and an implementation for determining the goodness metric of a cluster.

The set of attributes for a cluster may represent known and unknown relationships between a plurality of events comprised by the cluster. In one embodiment, the set of attributes for a cluster are updated every time a new event is added to the cluster. Steps 802 to 808 may be performed in any order or in parallel to each other or some Steps may not be performed at all. At Step 802, components of the Network Analytics module 300, such as the correlation engine 304, determine the goodness metric for the cluster. FIG. 9 describes an example cluster and an implementation for determining the goodness metric of a cluster.

Various algorithms may be used to structure a relationship between the events. In one implementation, a minimum spanning tree, as shown in FIG. 9, may be used to structure the relationships between events. In another implementation, a minimum bottleneck spanning tree may used instead.

As shown in FIG. 9, the events may act as nodes of the minimum spanning tree and may be connected by edges. Exemplary nodes in FIG. 9 include nodes 908, 910, 914 and 912. Exemplary edges in FIG. 9 include 906 (connecting nodes 908 and 910), 902 (connecting nodes 910 and 914), and 904 (connecting nodes 912 and 914). Each edge between the events represents the cost of the edge or the distance as calculated above in equations 1, 2, 3 and 4. The goodness of the cluster may be represented by the following equation:

$$g(G) = \text{cost of the longest edge in the } G, \quad (5)$$

wherein the minimum spanning tree represented in FIG. 9 in cluster 900 may be referred as G. As shown in FIG. 9, the edge 902 may be the longest edge in the tree G. The function g(G) captures the probability that a group of events are related to each other by a causal chain. The higher the goodness metric for a cluster is the lower the probability that the events in the cluster are closely related.

Referring momentarily to FIG. 6, at Steps 606 and 608, if the distance of the new event to the cluster is lower than the goodness metric of the cluster, the new event may be added to the cluster. In other words, if the shortest distance between the new event and at least one event in the cluster is shorter than the cost of the longest edge of the spanning tree, the new event may be added to the cluster 900.

At Step 804, the components of the Network Analytics module 300, such as the correlation engine 304, may determine the most significant event in the cluster for each severity level. Each event may be further classified by a severity level. The severity of an event may be based on factors such as hardware failures, slow drain device, transient error condition, and regular operational events. Any classification system may be used for classifying the events. In one embodiment, the severity level of the events may be categorized into Critical, Error and Warning classifications. For example, an event representing losing a heart-beat for a neighboring network level node or a switch fabric reformation may be categorized as a Critical event. On the other hand, dropping of frames or packets may be characterized as an Error event. CPU running at 70% or higher or network bandwidth, latency or throughput dropping below a pre-determined level may be characterized as a Warning event. In one implementation, the most significant event in the cluster may be an event with the earliest timestamp amongst critical events of the cluster. The most significant event of the cluster may be used for displaying the user through the UI 310 with error information regarding the most significant event from each highly ranked cluster, instead of cluttering the user with too much information about every event in the cluster.

At Step 806, components of the Network Analytics module 300, such as the correlation engine 304, may determine the number of events for each severity level. In one implementation, the correlation engine may determine the severity level of the new event and increment the count of events at that severity level.

At Step 808, components of the Network Analytics module 300, such as the correlation engine 304, may determine the timestamp for the last event. The timestamp for the last event added to the cluster may be used in maintaining the cluster. For instance, the timestamp for the last event may indicate the relevance of the cluster. In one implementation, a cluster may be deleted from memory and persisted to disk or other persistent storage for future reference if the timestamp of the last event added to the cluster is older than a time threshold.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Ranking of Clusters:

Referring back to FIG. 5, each cluster in FIG. 5 may be ranked against each other. In some implementations, ranking may be provided on a severity granularity. Ranking of the clusters may be based on a set of attributes associated with the cluster. The set of attributes associated with the cluster may represent relationships between events and may be dynamically derived from the attributes of the cluster. In some instances, the Network Analytics module may have no prior knowledge of these relationships until the relationships are formed (i.e. clusters) and the set of attributes of the cluster are determined. Therefore, the Network Analytics module may discover and learn these relationships, dynamically, at run time, as new data about the network is received. The ranking of these clusters, in essence, provides a ranking of the various discovered (previously unknown) and known relationships in the tree of clusters.

In one implementation, ranking the clusters against each other may include determining a goodness of the cluster as described in FIG. 9, wherein the goodness of the cluster from the cluster of event indicates how closely related the events of the cluster are, and ranking the cluster against the other clusters is based on determining a ranking vector for the cluster from the one or more clusters based on the number of events in the cluster and the goodness of the cluster from the one or more clusters of events.

In one implementation, the clusters from FIG. 5 may be ranked against each other using a ranking vector for each cluster as shown in the equation below:

$$R(G)[i] = \{(\text{number of events in } G \text{ whose severity level is } i)/(G)\} \quad (6)$$

In one implementation, as shown in equation (6), the clusters may be ranked across the different severity levels. For instance, R(G)[Critical] may represent a vector for the cluster representing the severity of the cluster at R(G) at the Critical classification. The number of events at the severity level may be normalized by accounting for the goodness (g(G)) of the cluster. For instance, if a cluster has many events at the Critical severity level, however, those events are not closely related (i.e., large goodness metric), then the cluster may still be ranked lower compared to other clusters. In one implementation, the ranking vector is dynamically generated using the attributes of the cluster at the time of display of the ranking to the user through the UI 310.

FIG. 10 is an example of a UI 310 display 1000 for the Network Analytics tool. The display 1000 is a non-limiting example, and fields and format for displaying information may be modified without departing from the scope of the invention. In one embodiment, the System Administrator logs into the Network Analytics module or tool and requests system health status. As shown in FIG. 10, the UI 310 displays the highest ranked cluster in the system by severity. Under Critical Events, the flaky links cluster and the slow drain devices are listed, followed by the Need Attention for High CPU Usage.

The clusters represent known and unknown relationships between events that may be dynamically derived from the attributes of the cluster. Aspects of this disclosure may present these relationships to the user for indicating the health of the network and providing the user with information relating to potential known and unknown failure conditions in the system. In some instances, the Network Analytics module may have no prior knowledge of these relationships until the relationships are formed (i.e. clusters) and the set of attributes of the cluster are determined. Therefore, the Network Analytics module may discover and learn these relationships, dynamically, at run time, as new data about the network is received. The ranking of these clusters, in essence, provides a ranking of the various discovered (previously unknown) and known relationships in the tree of clusters.

For the flaky link cluster, the UI 310 rolls out a story with a headline (1002) on the display for the cluster based on the most significant event in the cluster. For example, at 1014, the UI 310 conveys to the System Administrator a readable description of the event, that the "Port 10/12 toggled 10 times in the last 6 minutes." The headlines are followed by details of the most significant event, such as the network location that published the event (1016), the timestamp of the event (1018) and the functional block that published the event (1020).

The UI 310 continues publishing the most significant events on the display 1000 from the child nodes (1004 and 1008) of the flaky link cluster, with similar details discussed above. The UI 310, as shown in FIG. 10, continues publishing the most significant events for the next highes ranked clusters (1010) and their associated details, similar to the flaky link cluster from above. At 1012, the UI 310 displays the most significant event for the next level of severity, that needs the users attention, but may not be a critical event yet.

Figure 11A:
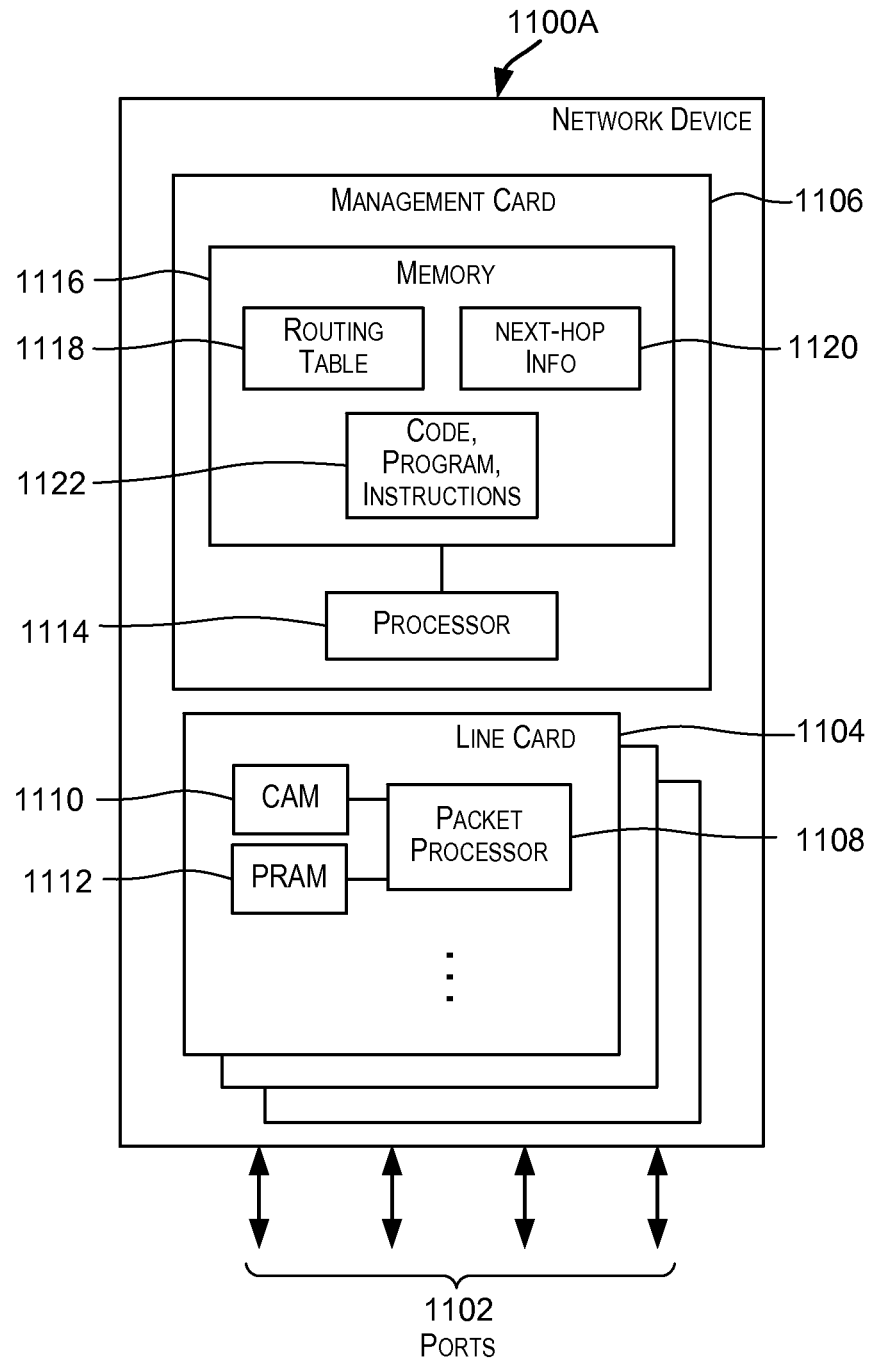
FIGS. 11A and 11B depict simplified block diagrams of a network device for performing embodiments of the present invention.

FIG. 11A depicts a simplified block diagram of a network device 1100A that may be configured to perform embodiments of the present invention. Network device 1100A may be a router or switch that is configured to forward data such as a router or switch provided by Brocade Communications Systems, Inc. In the embodiment depicted in FIG. 11A, network device 1100A comprises a plurality of ports 1102 for receiving and forwarding data packets and multiple cards that are configured to perform processing to facilitate forwarding of the data packets. The multiple cards may include one or more line cards 1104 and one or more management cards 1106. A card, sometimes also referred to as a blade or module, can be inserted into one of a plurality of slots on the chassis of network device 1100A. This modular design allows for flexible configurations with different combinations of cards in the various slots of the device according to differing network topologies and switching requirements. The components of network device 1100A depicted in FIG. 11A are meant for illustrative purposes only and are not intended to limit the scope of the invention in any manner. Alternative embodiments may have more or less components than those shown in FIG. 11A.

Ports 1102 represent the I/O plane for network device 1100A. Network device 1100A is configured to receive and forward data using ports 1102. A port within ports 1102 may be classified as an input port or an output port depending upon whether network device 1100A receives or transmits a data packet using the port. A port over which a data packet is received by network device 1100A is referred to as an input port. A port used for communicating or forwarding a data packet from network device 1100A is referred to as an output port. A particular port may function both as an input port and an output port. A port may be connected by a link or interface to a neighboring network device or network. Ports 1102 may be capable of receiving and/or transmitting different types of data traffic at different speeds including 1 Gigabit/sec, 10 Gigabits/sec, or more. In some embodiments, multiple ports of network device 1100A may be logically grouped into one or more trunks.

Upon receiving a data packet via an input port, network device 1100A is configured to determine an output port for the packet for transmitting the data packet from the network device to another neighboring network device or network. Within network device 1100A, the packet is forwarded from the input network device to the determined output port and transmitted from network device 1100A using the output port. In one embodiment, forwarding of packets from an input port to an output port is performed by one or more line cards 1104. Line cards 1104 represent the data forwarding plane of network device 1100A. Each line card 1104 may comprise one or more packet processors 1108 that are programmed to perform forwarding of data packets from an input port to an output port. A packet processor on a line card may also be referred to as a line processor. Each packet processor 1108 may have associated memories to facilitate the packet forwarding process. In one embodiment, as depicted in FIG. 11A, each packet processor 1108 may have an associated content addressable memory (CAM) 1110 and a RAM 1112 for storing forwarding parameters (RAM 1112 may accordingly also be referred to as a parameter RAM or PRAM). In one embodiment, for a packet received via an input port, the packet is provided to a packet processor 1108 of a line card 1104 coupled to the input port. The packet processor receiving the packet is configured to determine an output port of network device 1100A to which the packet is to be forwarded based upon information extracted from the packet. The extracted information may include, for example, the header of the received packet. In one embodiment, a packet processor 1108 is configured to perform a lookup in its associated CAM 1110 using the extracted information. A matching CAM entry then provides a pointer to a location in the associated PRAM 1112 that stores information identifying how the packet is to be forwarded within network device 1100A. Packet processor 1108 then facilitates forwarding of the packet from the input port to the determined output port.

Since processing performed by a packet processor 1108 needs to be performed at a high packet rate in a deterministic manner, packet processor 1108 is generally a dedicated hardware device configured to perform the processing. In one embodiment, packet processor 1108 is a programmable logic device such as a field programmable gate array (FPGA). Packet processor 1108 may also be an ASIC.

Management card 1106 is configured to perform management and control functions for network device 1100A and thus represents the management plane for network device 1100A. In one embodiment, management card 1106 is communicatively coupled to line cards 1104 and includes software and hardware for controlling various operations performed by the line cards. In one embodiment, a single management card 1106 may be used for all the line cards 1104 in network device 1100A. In alternative embodiments, more than one management cards may be used, with each management card controlling one or more line cards.

A management card 1106 may comprise a processor 1114 (also referred to as a management processor) that is configured to perform functions performed by management card 1106 and associated memory 1116. As depicted in FIG. 11A, the routing table 1118 and associated next-hop and RI information may be stored in memory 1116. The next-hop and RI information may be stored and used in an optimized manner as described above. Memory 1116 is also configured to store various programs/code/instructions 1122 and data constructs that are used for processing performed by processor 1114 of management card 1106. For example, programs/code/instructions, which when executed by processor 1114 cause the next-hop information to be stored in an optimized manner may be stored in memory 1116. In one embodiment, processor 1114 is a general purpose microprocessor such as a PowerPC, Intel, AMD, or ARM microprocessor, operating under the control of software 1122 stored in associated memory 1116.

In one embodiment, the functions performed by management card processor 1114 include maintaining a routing table, creating associations between routes in the routing table and next-hop information, updating the routing table and associated next-hop information responsive to changes in the network environment, and other functions. In one embodiment, management processor 1114 is configured to program the packet processors and associated memories of line cards 1104 based upon the routing table and associated next-hop information. Programming the packet processors and their associated memories enables the packet processors to perform data packet forwarding in hardware. As part of programming a line card packet processor and its associated memories, management processor 1114 is configured to download routes and associated next-hops information to the line card and program the packet processor and associated memories. Updates to the next-hop information are also downloaded to the line cards to enable the packet processors on the line cards to forward packets using the updated information.

Figure 11B:
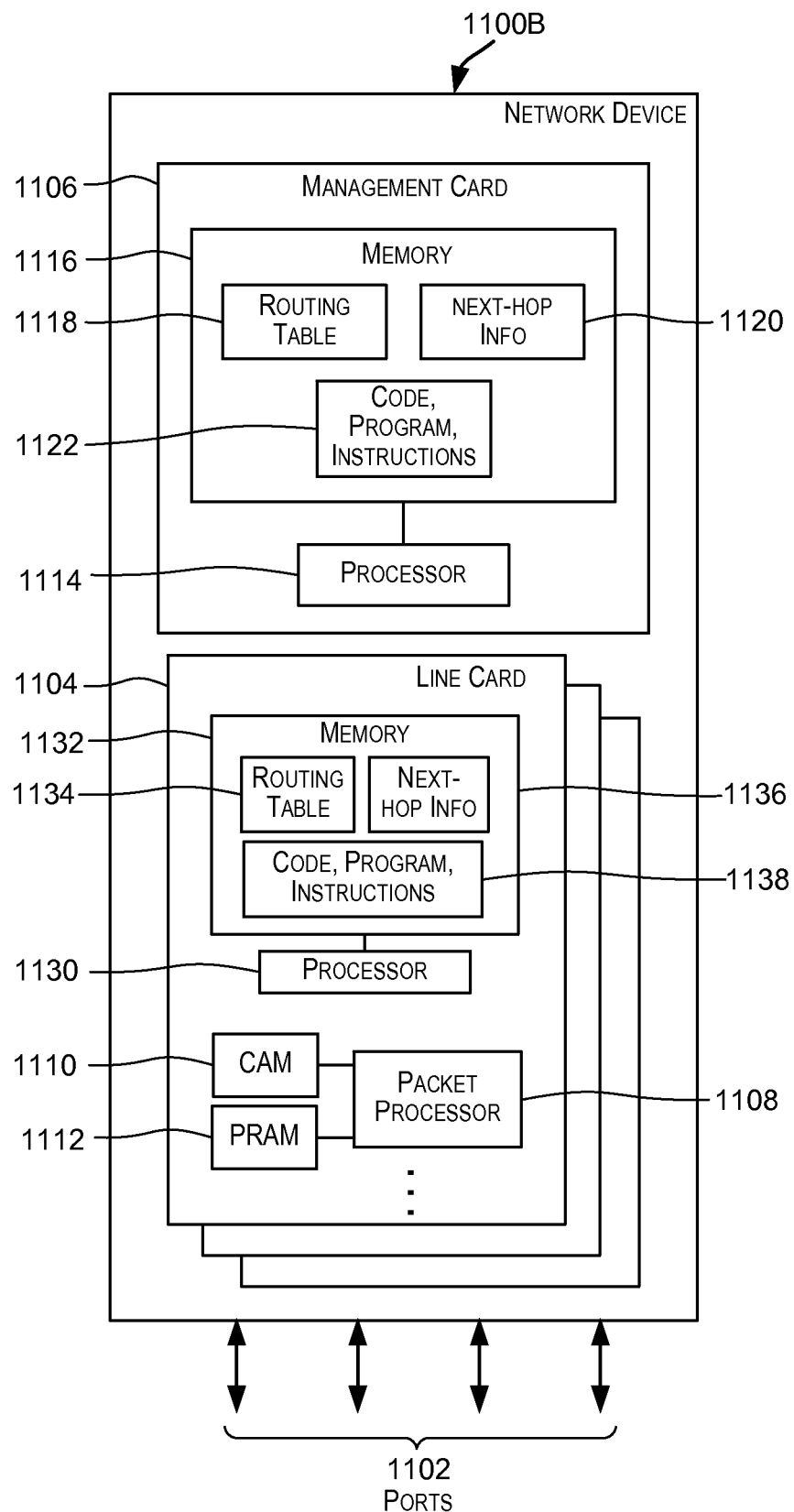

FIG. 11B depicts another example of a network device 1100B that may incorporate an embodiment of the present invention. Network device 1100B is similar to network device 1100A depicted in FIG. 11A and described above except that line card 1104 additionally comprises a processor 1130 and associated memory 1132. Processor 1130 may be a CPU similar to management processor 1114. In this embodiment, line card memory 1132 may store routing table 1134 and associated next-hop information 1136. Processor 1130 uses the routing and next-hop information stored in memory 1132 to program the packet processors and their associated memories on the line card. In one embodiment, routing table 1134 and associated next-hop information 1136 is kept synchronized with routing table 1118 and next-hop information 1120 stored by management card 1106. Management card 1106 is configured to download the routing and associated next-hop information stored in its memory 1116 to a line card 1104. The routing and next-hop information downloaded to a line card 1104 from the management card is then stored in memory 1132 of the line card and used to program packet processors 1108 and their associated memories. When changes are made to the routing table and associated next-hop information stored in management card 1106, the changes are downloaded to the line card so that the routing and next-hop information stored in memory 1132 of the line card can be updated to reflect the changes.

As described above, for both network device embodiments depicted in FIGS. 11A and 11B, routing table and associated next-hop information is downloaded from a management card to a line card. In the embodiment depicted in FIG. 11A the information may be downloaded as part of the management processor programming the packet processors and associated memories on the line card. For the embodiment depicted in FIG. 11B, the information may be downloaded and stored in memory 1132 on the line card. Processor 1130 on the line card may then use the stored information to program the packet processors and their associated memories. In one embodiment, the whole routing table and associated next-hop information is downloaded to the line card from the management card.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A computing device comprising one or more processing units configured to:
   determine a first event from information;
   allocate the first event to a first cluster from one or more clusters of events, based on a set of attributes associated with the first event, the set of attributes comprising:
      location information indicative of a location in a network where the first event occurred; and
      time information indicative of a time when the first event occurred in the network;
   determine a set of attributes for the first cluster; and
   rank the first cluster against other clusters from the one or more clusters of events based on the set of attributes for the first cluster and a set of attributes for the other clusters from the one or more clusters, wherein a timestamp of a last event added to each cluster is one of the set of attributes for each cluster from the one or more clusters.

2. The computing device of claim 1, wherein the set of attributes for the first cluster are indicative of a relationship between a plurality of events from the first cluster.

3. The computing device of claim 2, wherein the relationship between the plurality of events from the first cluster is unknown prior to a formation of the relationship.

4. The computing device of claim 1, wherein the set of attributes for the first event further comprises one or more categories indicating information associated with the first event, wherein the one or more categories comprises one or more of a hardware error category, a software error category, a performance category, a permissions category or a topology category.

5. The computing device of claim 1, wherein the first event is one of a raw event, a derived event or a topology event.

6. The computing device of claim 1, wherein the network comprises a topology of one or more network level nodes in a network topology or device level nodes in a device topology.

7. The computing device of claim 1, wherein the one or more processing units are configured to:
   determine a distance between the first event and the first cluster, wherein the distance determined between the first event and the first cluster is indicative of a probability that the first event and the first cluster are directly related to each other; and
   allocate the first event to the first cluster if the distance is below a distance threshold.

8. The computing device of claim 7, wherein the determining the distance between the first event and the first cluster comprises:
   determining, by the one or more processing units, a shortest distance between the first event and each of one or more events from the first cluster based upon a set of attributes associated with the first event and each event of one or more events from the first cluster.

9. The computing device of claim 8, wherein the one or more events from the first cluster are the events that occurred in a past pre-determined period of time.

10. The computing device of claim 1, wherein the first cluster is removed from memory if the timestamp of the last event added to the cluster is older than a time threshold.

11. A method comprising:
    determining, by one or more processing units, a first event from information;
    allocating, by the one or more processing units, the first event to a first cluster from one or more clusters of events, based on a set of attributes associated with the first event, the set of attributes for the first event comprising:
       location information indicative of a location in a network where the first event occurred; and
       time information indicative of a time when the first event occurred in the network;
    determining, by the one or more processing units, a set of attributes for the first cluster; and
    ranking, by the one or more processing units, the first cluster against other clusters from the one or more clusters of events based on the set of attributes for the first cluster, wherein a timestamp of a last event added to each cluster is one of a set of attributes for each cluster.

12. The method of claim 11, wherein the set of attributes for the first cluster are indicative of a relationship between a plurality of events from the first cluster.

13. The method of claim 12, wherein the relationship between the plurality of events from the first cluster is unknown prior to a formation of the relationship.

14. The method of claim 11, wherein the set of attributes for the first event further comprises one or more categories indicating information associated with the first event, wherein the one or more categories comprises one or more of a hardware error category, a software error category, a performance category, a permissions category or a topology category.

15. The method of claim 11, wherein the method comprises:
    determining a distance between the first event and the first cluster, wherein the distance determined between the first event and the first cluster is indicative of a probability that the first event and the first cluster are directly related to each other; and
    allocating the first event to the first cluster if the distance is below a distance threshold.

16. A computing device comprising one or more processing units configured to:
    determine a first event from information;
    allocate the first event to a first cluster from one or more clusters of events, based on a set of attributes associated with the first event, the set of attributes comprising:
       location information indicative of a location in a network where the first event occurred; and
       time information indicative of a time when the first event occurred in the network;
    determine a set of attributes for the first cluster comprising a goodness associated with the first cluster, wherein the goodness associated with the first cluster indicates how closely related events of the first cluster are to each other; and
    rank the first cluster against other clusters from the one or more clusters of events based on a number of the events in the first cluster and the set of attributes for the first cluster.

17. A computing device comprising one or more processing units configured to:
    determine a first event from information;
    allocate the first event to a first cluster from one or more clusters of events, based on a set of attributes associated with the first event, the set of attributes comprising:
       location information indicative of a location in a network where the first event occurred; and time information indicative of a time when the first event occurred in the network;

determine a set of attributes for the first cluster; and rank the first cluster against other clusters from the one or more clusters of events based on the set of attributes for the first cluster and a set of attributes for the other clusters form the one or more clusters, wherein the ranking comprises ranking the one or more clusters of events for each severity level associated with one or more events from the one or more clusters of events.

18. A computing device comprising one or more processing units configured to:

determine a first event from information;

allocate the first event to a first cluster from one or more clusters of events, based on a set of attributes associated with the first event, the set of attributes comprising:
  location information indicative of a location in a network where the first event occurred; and
  time information indicative of a time when the first event occurred in the network;

determine a set of attributes for the first cluster;

rank the first cluster against other clusters from the one or more clusters of events based on the set of attributes for the first cluster;

determine if the first cluster is ranked amongst a pre-determined number of highest ranked clusters from the one or more clusters; and provide one or more events from the first cluster for displaying through a user interface.

19. A computing device comprising one or more processing units configured to:

determine a first event from information;

allocate the first event to a first cluster from one or more clusters of events, based on a set of attributes associated with the first event, the set of attributes comprising:
  location information indicative of a location in a network where the first event occurred; and
  time information indicative of a time when the first event occurred in the network;

determine a set of attributes for the first cluster; and rank the first cluster against other clusters from the one or more clusters of events based on the set of attributes for the first cluster, wherein the first cluster comprises a most significant event in the cluster and the most significant event in the first cluster is an event with an earliest timestamp amongst the events of the first cluster.

* * * * *

UNITED STATES PATENT AND TRADEMARK OFFICE
CERTIFICATE OF CORRECTION

| | |
|---|---|
| PATENT NO. | : 9,213,590 B2 |
| APPLICATION NO. | : 13/830286 |
| DATED | : December 15, 2015 |
| INVENTOR(S) | : Subramanian Lakshmanan et al. |

It is certified that error appears in the above-identified patent and that said Letters Patent is hereby corrected as shown below:

ON THE TITLE PAGE

Page 1

Item (72) Inventors:

Replace "Sathish Gnanasekaren, Sunnyvale, CA (US)" with --Sathish Gnanasekaran, Sunnyvale, CA (US)--

Signed and Sealed this
Twelfth Day of April, 2016

Michelle K. Lee
*Director of the United States Patent and Trademark Office*